(12) United States Patent
Guo et al.

(10) Patent No.: US 6,600,320 B2
(45) Date of Patent: Jul. 29, 2003

(54) APPARATUS WITH MOVABLE RECEIVER COIL ARRAY FOR LOCATING A BURIED METALLIC OBJECT

(75) Inventors: Yanping Guo, Silver Spring, MD (US); Harvey W. Ko, Ellicott, MD (US); Carl V. Nelson, Rockville, MD (US); David M. White, Silver Spring, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/928,632

(22) Filed: Aug. 13, 2001

(65) Prior Publication Data

US 2002/0030492 A1 Mar. 14, 2002

Related U.S. Application Data

(60) Continuation of application No. 09/607,607, filed on Jun. 30, 2000, now abandoned, which is a division of application No. 08/824,644, filed on Mar. 24, 1997, now Pat. No. 6,084,412.
(60) Provisional application No. 60/014,151, filed on Mar. 25, 1996.

(51) Int. Cl.[7] .............................. G01V 3/08; G01V 3/11
(52) U.S. Cl. ....................................... 324/336; 324/334
(58) Field of Search ................................ 324/239, 326, 324/329, 334–337, 345

(56) References Cited

U.S. PATENT DOCUMENTS

| | | | | |
|---|---|---|---|---|
| 2,560,834 A | * | 7/1951 | Whitehead et al. | 324/326 |
| 3,315,155 A | * | 4/1967 | Colani | 324/336 X |
| 3,959,721 A | * | 5/1976 | Roschuk et al. | 324/334 X |
| 4,021,725 A | * | 5/1977 | Kirkland | 324/345 X |
| 4,595,877 A | * | 6/1986 | Dulk | 324/336 X |
| 4,600,356 A | * | 7/1986 | Bridges et al. | 324/329 X |
| 4,727,329 A | * | 2/1988 | Behr | 324/345 |
| 4,837,514 A | * | 6/1989 | Spies | 324/336 |
| 5,059,902 A | * | 10/1991 | Linder | 324/239 X |
| 5,321,361 A | * | 6/1994 | Goodman | 324/326 |
| 5,467,018 A | * | 11/1995 | Ruter et al. | 324/336 |
| 5,770,944 A | * | 6/1998 | Ebinger et al. | 324/329 |
| 6,084,412 A | * | 7/2000 | Guo et al. | 324/336 |

* cited by examiner

*Primary Examiner*—Gerard R. Strecker
(74) *Attorney, Agent, or Firm*—Francis A. Cooch

(57) ABSTRACT

A unique time-domain electromagnetic system and data processing technique which, using low frequency electromagnetic fields, can localize, in three-dimensions, the position of buried metallic objects is disclosed. The measurement system uses time-domain electromagnetic techniques on a scanning frame similar to a X-Y plotter. The system collects magnetic data over a large area above the buried object. The spatial information of the field detected on the ground is then processed with an unique 'nearfield holographic' data processing method to reconstruct the field image of the buried object.

3 Claims, 24 Drawing Sheets

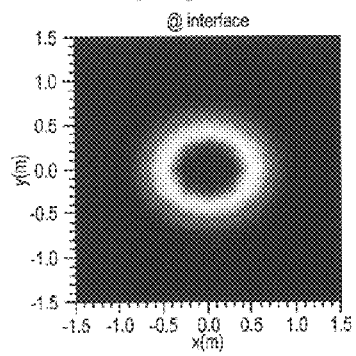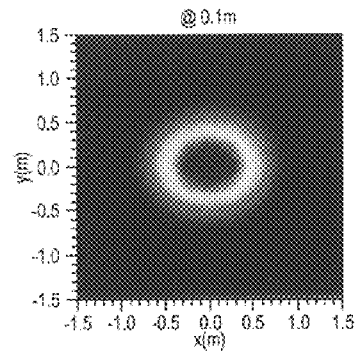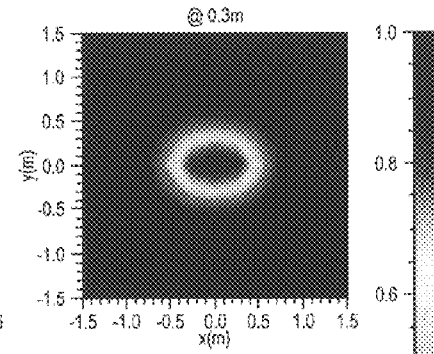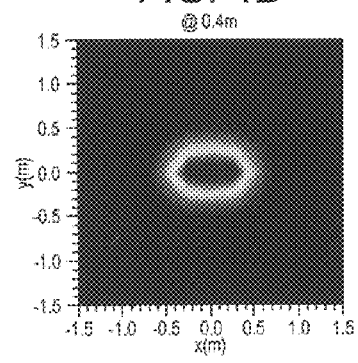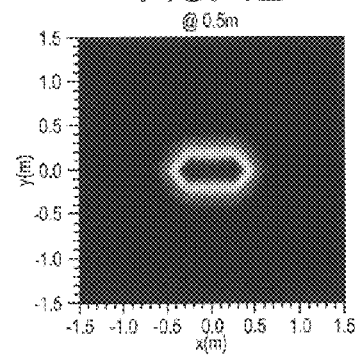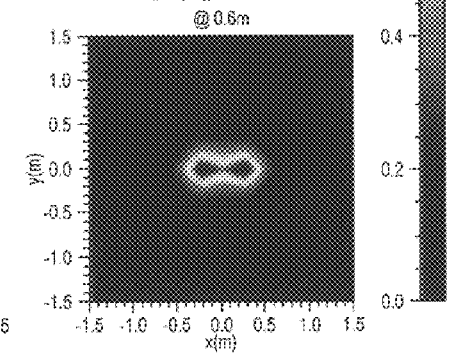

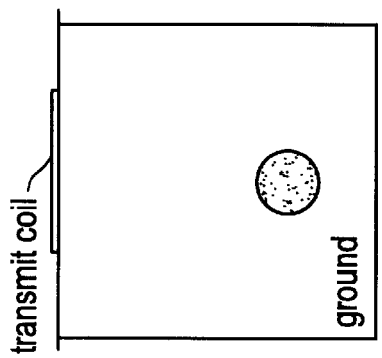
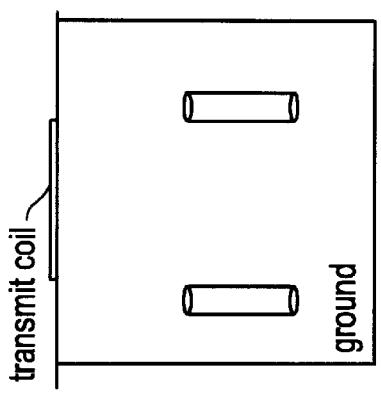
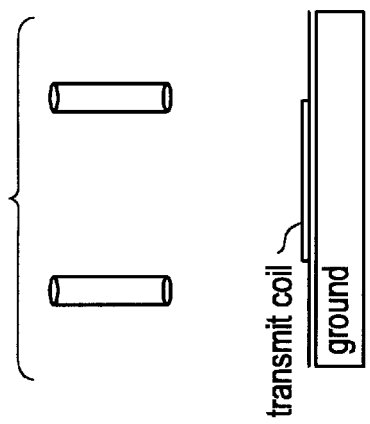

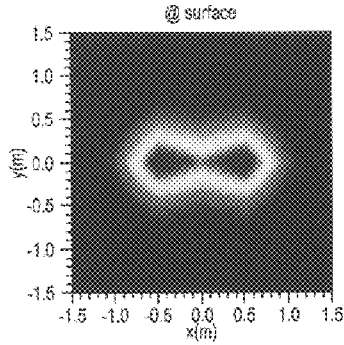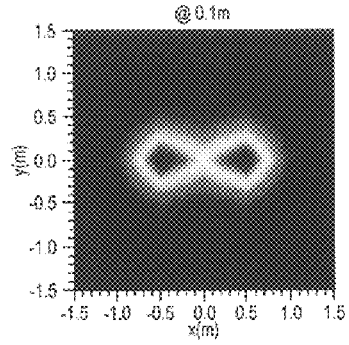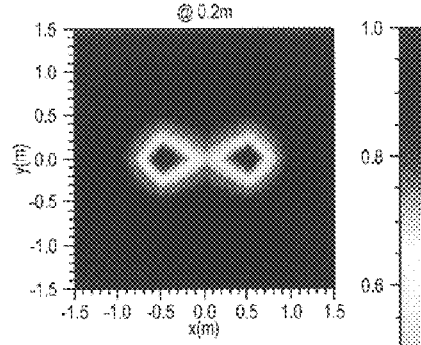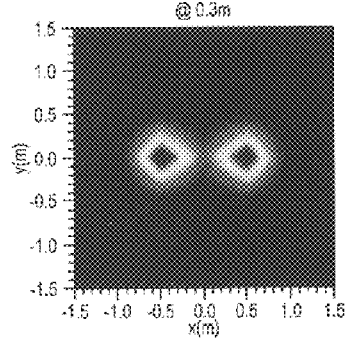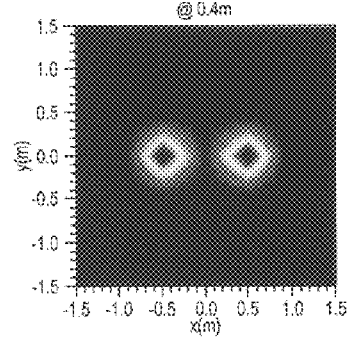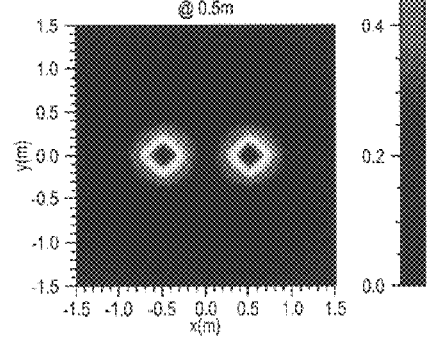

@ 0.6m

@ 0.7m

@ 0.8m

@ 0.9m

@ 1.0m

@ 1.1m ps with Movable Receiver# APPARATUS WITH MOVABLE RECEIVER COIL ARRAY FOR LOCATING A BURIED METALLIC OBJECT

CROSS-REFERENCE TO RELATED APPLICATION

This is a continuation of application Ser. No. 09/607,607, filed Jun. 30, 2000, now abandoned, which is a divisional of prior filed copending application Ser. No. 08/824,644, filed Mar. 24, 1997, now issued as U.S. Pat. No. 6,084,412, Jul. 4, 2000, which claims the benefit of prior filed copending U.S. provisional application Ser. No. 60/014,151, filed Mar. 25, 1996.

STATEMENT OF GOVERNMENTAL INTEREST

This invention was made with Government support under Contract No. N00039-94-C-0002 awarded by the Department of the Navy. The Government has certain rights in the invention.

BACKGROUND OF THE INVENTION

Detection of underground objects has long been a very active research subject because of its important applications in mine detection, geological exploration, forensic investigation, treasure hunting, etc. Recent emphasis on environmental clean-up and remediation, has increased interest in this area. In converting abandoned military bases to civil use and in cleaning old battle fields, objects left in the ground, such as shells, unexploded ordnance (UXO), etc., need to be detected and removed.

Most of the techniques and systems currently available for the detection of underground objects are of the type which search the designated area and indicate the possible existence of some underground objects. They lack the capability to precisely locate and characterize the objects.

The difficulty in characterizing underground objects with electromagnetic (EM) methods stems from the ground medium surrounding the objects. Unlike air which is transparent and almost lossless for EM wave propagation, the ground is conductive and generally inhomogeneous causing an increase in signal dissipation and localization errors. Since dissipation increases with the EM frequency, it limits the use of the EM energy to low frequency bands when depth penetration beyond several meters is desired.

In air, the electromagnetic field satisfies the Helmholtz wave equation and operates in a propagation mode at distances between the source and the receiver much greater than a free space wavelength. The amplitude of the fields either remains constant or changes relatively slowly, but the phase changes rapidly with distance. From the phase delay of an electromagnetic field reflected from a target one can tell the range between the target and the observer. The directivity, or focused direction, along which the antenna transmits and receives the electromagnetic field gives the direction of the target. The range combined with the direction indicates the location of the target.

In contrast, in the ground, at measurement ranges much less than a wavelength, the electromagnetic field basically satisfies a diffusion type equation in the low frequency limit, rather than the usual wave equation as in the air. For distances much less than a wavelength, the phase delay, related to the spatial variation of the waves (i.e., $e^{j2\pi x/\lambda}$), is too small to be used to measure the object's range and shape or to resolve multiple objects. In addition, the small size of the transmitter and receiver aperture relative to a wavelength does not provide a capability for measuring direction to the buried object.

Because of the potential danger involved in the remediation of abandoned military bases and old battlefields, not just the detection of the underground objects is required, but a more precise characterization which includes location, orientation, size, shape, and material composition is desirable. New technological systems which can satisfy these requirements are in urgent demand.

SUMMARY OF THE INVENTION

The invention is a method of localizing highly conducting, (e.g., metallic) buried objects by measuring their field distribution on or above the surface and then reconstructing the field as a function of depth in the ground utilizing a nearfield holography algorithm. The three dimensional locations of the objects are determined from the reconstructed field images of the objects. Also disclosed is a time-domain electromagnetic sensor system that collects the data used by the nearfield holographic technique of the invention.

The conventional ranging method is based on the observation of a phase change, i.e., the temporal change, of the field at a fixed station in space. For underground objects located at a distance of a small fraction of a wavelength, i.e., located in the nearfield, the temporal change of the field is negligible. However, in the diffusion region the magnitude of the field is very sensitive to the distance from the object. Since the field decays approximately inversely as the third power of the distance, a small change in distance leads to a significant change in the field magnitude. Based on this fact, instead of observing the temporal field change at a fixed point in space, more accurate information about underground objects can be obtained by examining the spatial change of the field in a plane above the ground.

In its simplest form, the nearfield holographic technique is a combination of an EM measurement procedure and a method for treating the resulting EM data. The area where the object is buried is illuminated with an active transient time-domain EM source located on or above the ground and scanned over an mxn grid on the surface. The field radiated from the source penetrates into the ground and induces eddy currents inside the object. These eddy currents act as a secondary source which re-radiates EM fields. The re-radiated EM fields from the object, or the time-rate-of-change of the secondary magnetic fields, are then measured at each of the points on the mxn grid in a horizontal plane at the surface of the ground in the vicinity of the buried object.

For a sensor/receiver coil operating in a time domain mode, the received signal at each grid point is Fourier transformed to the frequency domain, so that the secondary magnetic fields re-radiated from the object are obtained as a function of frequency. The characteristic frequency from the resulting frequency domain response, or the measurement frequency for a sensor/receiver coil operating in the frequency domain, is used as the image reconstruction frequency.

The magnetic field, after being transformed into the frequency domain, is a complex function having both magnitude and phase. At a particular frequency, the magnetic fields at the individual grid points in the detection plane form a spatial distribution of the measured magnetic field in that plane. The spatial variation of the magnetic field depends on the characteristics of the buried object and the distance from the object. This spatial distribution of the magnetic field at the detection plane is used to reconstruct the magnetic field distribution in the horizontal plane at various depths in the ground by spatial Fourier transforms and a backward propagation algorithm. It is first Fourier transformed in two dimensions to form the spatial frequency spectrum. This spectrum is multiplied by a propagation function determined from the Helmholtz equation for a desired depth, d. The result is inverse Fourier transformed in two dimensions to produce the reconstructed image at depth, d.

The above process is repeated for a range of depths, d, that bracket the expected depths of the buried objects. The resulting images in the back propagated planes, i.e., the reconstructed magnetic field distributions, are then examined to resolve closely spaced objects and to determine the depth and the location in the horizontal plane. The depth of the object is the point where the image is the smallest, or focused, since the re-radiated fields expand in all directions from the location of the object.

Thus, the invention meets the goal of locating and resolving highly conducting buried objects such as UXO and mines, which are small in size and shallow compared to general geological structures, that are buried in the nearfield, i.e., at depths and separated by distances much less than a wavelength.

BRIEF DESCRIPTION OF THE DRAWINGS

FIG. 14, comprising FIGS. 14(*a*), 14(*b*) and 14(*c*), illustrates configurations of the test objects: 14(*a*) two steel pipes suspended above the ground; 14(*b*) two steel pipes buried in the ground; and 14(*c*) a cannon ball buried in the ground.

DETAILED DESCRIPTION OF THE INVENTION

The invention's goal is to identify the location of underground objects based on the image of a reconstructed field distribution in the ground from the measured field above or on the ground. The primary electromagnetic field originating from an illuminating source with limited dimension will spread out in space and impinge on an object. Similarly, viewed in a vertical set of horizontal planes, the spatial size of the secondary field, induced from an object, increases in each horizontal plane as a function of the vertical distance from the object.

If the images of the induced field distribution in a series of horizontal planes are displayed along the vertical direction starting from a detection plane above the object downward to a plane deeper than the object, one will observe the image pattern varying gradually from a large spot to a small one, and then becoming a large one again. The change of the image pattern corresponds to the change of the spatial spreading of the field. The smallest, or the most focused, image pattern should occur in the plane where the object is located because the object is the source of the induced field. An estimate of the depth of the object is therefore obtained and the image of the field distribution in that plane will give the horizontal location of the object.

From the field images displayed in horizontal or level planes, one can also resolve closely spaced multiple objects. The field detected at the surface is the resultant field of the fields induced in each object if there is more than one object involved. The complete surface measured field may not indicate the number of objects if the spread of the individual object fields overlap each other because of their close proximity to each other. When the measured field is reconstructed at the object level plane, each individual induced field becomes confined to the object, and hence the individual objects become separately identifiable.

Figure 1:
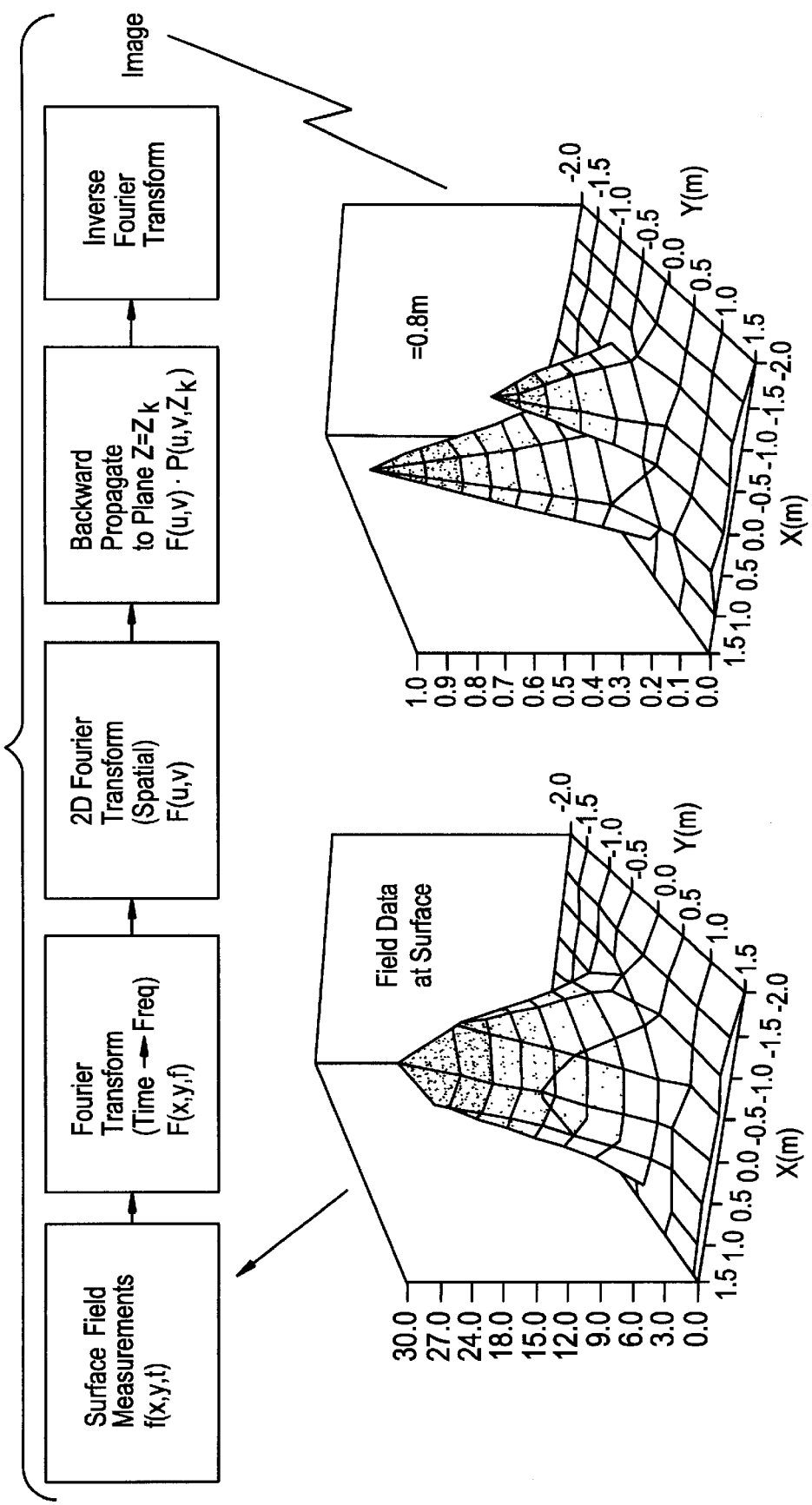
FIG. 1 illustrates in schematic form the nearfield electromagnetic holographic method of the invention.

To implement the reconstruction of the field in the ground from the field measured on the surface, a field reconstruction method has been developed, which is called nearfield electromagnetic holography as illustrated in FIG. 1.

To describe the field reconstruction algorithm, first consider the case of localizing a source in free space. We assume that the complex function $f_0(x_0, y_0)$ represents one of the components of the electromagnetic field of the source measured at plane $z=0$ with the z-axis pointing upwards, and that the source is located below the measurement plane at $z=-d$. The distribution of the field at the detection plane may be decomposed into a series of plane waves through a Fourier transform $$F_0(k_x, k_y) = \int\int_{-\infty}^{+\infty} f_0(x_0, y_0) e^{-i(x_0 k_x + y_0 k_y)} dx_0 dy_0 \qquad (1)$$

where $k_x$ and $k_y$ are the spatial frequencies of the elementary plane waves. The $e^{-i\omega t}$ time oscillation is assumed for the field throughout. On the other hand, the distribution of the field at the source plane ($f_z$), or at the other level planes, may be obtained by a superposition of the plane waves utilizing an inverse Fourier transform, $$f_z(x, y, z) = \frac{1}{(2\pi)^2} \int\int_{-\infty}^{+\infty} F_z(k_x, k_y, z) e^{i(k_x x + k_y y)} dk_x dk_y \qquad (2)$$

The spectrum $F_z(k_x,k_y,z)$ namely, the distribution of the plane waves in k space at a level plane, should be related to the one at the detection plane. In the forward process, the plane waves are propagated from the source plane to the detection plane. In the inverse process, we may let the plane waves propagate backward from the detection plane to a level plane. Therefore the spectral function at a level plane may be expressed as the spectrum at the detection plane multiplied by a propagation function $$F_z(k_x,k_y,z) = F_0(k_x,k_y) P(k_x,k_y,z) \qquad (3)$$

The propagator $P(k_x,k_y,z)$ may be determined from the Helmholtz equation which the electromagnetic field obeys in the homogeneous medium. Consider the field at a plane with arbitrary z, $$f_z(x, y, z) = \frac{1}{(2\pi)^2} \int\int_{-\infty}^{+\infty} F_0(k_x, k_y) P(k_x, k_y, z) e^{i(k_x x + k_y y)} dk_x dk_y \qquad (4)$$

which upon substitution into the Helmholtz equation $$\nabla^2 f_z(x, y, z) + k_0^2 f_z(x, y, z) = 0, \qquad (5)$$

leads to the following differential equation for the propagator:

$$\frac{\partial^2 P}{\partial z^2} + (k_0^2 - k_x^2 - k_y^2) P = 0 \qquad (6)$$

where $k_0$ is the wave number of the electromagnetic field in the medium. For this introductory free space illustration $$k_o = \frac{\omega}{C} \qquad (7)$$

where $\omega$ is the angular frequency of the source field and c is the light speed in air.

From this equation and the initial condition at the detection plane the propagator is found to be $$P(k_x, k_y, z) = \exp\left(iz\sqrt{k_0^2 - k_x^2 - k_y^2}\right) \qquad (8)$$

The propagator $P(k_x,k_y,z)$ describes how each of the elementary plane waves propagates backward in the vertical direction. It is observed from the expression for the propagator given by Eq. (8) that not all of the plane waves propagate in the same way. There are two kinds of waves depending on whether the wave number ($k_x^2 + k_y^2$) is greater or less than the wave number of the illuminator source field $k_0^2$. When $k_x^2 + k_y^2 < k_0^2$, the square root in Eq. (8) is real, so that the propagator only modifies the phase of the wave. The waves that satisfy this condition are called the propagating waves, their amplitudes remain unchanged and only their phases change when propagating. However when $k_x^2 + k_y^2 > k_0^2$, the square root in Eq. (8) is an imaginary number, and the propagator becomes an exponential function of the vertical distance. In the forward process, the amplitudes of these waves decrease exponentially as they propagate, and the waves in this case are called evanescent waves.

In conventional holography, the evanescent waves are normally neglected in image reconstruction. Since the hologram is generally recorded several wavelengths away from the source, the evanescent waves are small and undetectable. However, in the nearfield case, the evanescent waves can play an important role for improving the resolution of the reconstructed field. It is the evanescent waves that can help the resolution in the nearfield, low frequency case yielding results better than conventional methods.

The resolution usually refers to the minimum distance between two points in space for which their wave field can be distinguished. Hence, the resolution R is related to the highest spatial frequency of the field as $$R = \frac{\pi}{k_{\max}} \qquad (9)$$

The maximum spatial frequency in conventional holography is the wave number of the applied source field, i.e., $k_{max} = k = 2\pi/\lambda$, so that the best resolution is $R = \lambda/2$. This is the so-called Rayleigh's criterion indicating that resolution is wavelength-limited. For the problem of detecting objects buried in the ground, the wavelength of the applied electromagnetic field is typically hundreds of meters in the earth. The resolution, according to Rayleigh's criterion, will be poor if conventional holography technique is applied.

Practically, the distribution of the field radiated from buried objects is measured at a distance which is a small fraction of a wavelength of the applied electromagnetic field. In this near-field range, some of the evanescent waves are detectable. It thus becomes a great advantage to utilize the evanescent waves in the reconstruction of the field image. The maximum spatial frequency of the field can be much greater than the wave number of the applied EM source, and the resolution can be significantly improved. As a result, the resolution is not limited by the wavelength but depends on the degree to which the evanescent waves can be actually measured.

To illustrate the above, metallic objects are buried in the ground and are assumed to be detected by applying a low frequency electromagnetic source, usually an electrical current coil, placed at or above the ground. The field radiated from the source penetrates into the ground and induces eddy currents inside the buried objects. These eddy currents act as a secondary source re-radiating electromagnetic fields. The fields are then detected by detectors located at or above the ground surface. The field generated by the source is called the primary field, or the source field, and the field re-radiated from the objects is called the secondary field, or the object field. It is the object field that is measured and used to reconstruct the field images.

Since the source, detector and objects are in different media there are multiple reflections at the interface. As described below, the effects of the direct and interface reflected fields from the source are dealt with by using a transient time-domain sensor system. With this kind of system, the important secondary field from the object is measured during the time interval when the source is turned off.

For the purpose of reconstruction of the object field in the ground, we need only to be concerned with the object field measured at the surface. Although an accurate object field can not be reconstructed beneath the surface without knowing the reflected field from the surface, an approximate solution may be obtained by ignoring the reflected field.

The purpose of reconstructing the object field at level planes here is to determine the depth of the object. It is based on the principle that the back-propagated object field will converge at the object's true location. The approximate solution of the object field can still serve this purpose because the transmitted fields are the main part of the outgoing field generated by the object, and they should also converge at, or substantially close to, the object location.

As we see from Eq. (8), the wave number of the source field in the medium is needed for the calculation of the propagator. At low frequencies, by neglecting displacement currents, the wave number $k_o$ in the earth can be approximated as $$k_o = \sqrt{i\omega\mu\sigma} \quad (10)$$

where $\omega$ is the angular frequency of the source field, and $\mu$ and $\sigma$ are the magnetic permeability and electrical conductivity of the earth, respectively. In most circumstances, the magnetic permeability of the earth is the same as the value in free space. The conductivity of the earth is generally a function of position, but it can be approximated with an average value. The propagator is not very sensitive to the inhomogeneity of the conductivity since the values of $k_x$ and $k_y$ in the propagator expression are much greater than the wave number in most cases. When the measurement is not on the earth's surface but on a plane in the air, the field is first downward continued to the earth's surface using the wavenumber in the air, Eq. (7), and then downward continued into the earth using the wavenumber in the earth given by Eq. (10).

The conductivity of the earth lies in the range 0.001 S/m (for dry sandy soil) to 0.01 S/m (for marshy soil), while the conductivity of a metallic object is typically about $10^6$ S/m, which results in a large conductivity contrast between the object and its surrounding medium. At low frequencies, the secondary magnetic field usually dominates the secondary electric field, and only the magnetic field is measured in most cases. Eddy currents will also be induced in the earth itself, but the field associated with the earth eddy currents is negligible compared with the field generated by eddy currents from the highly conducting object.

Figure 2:
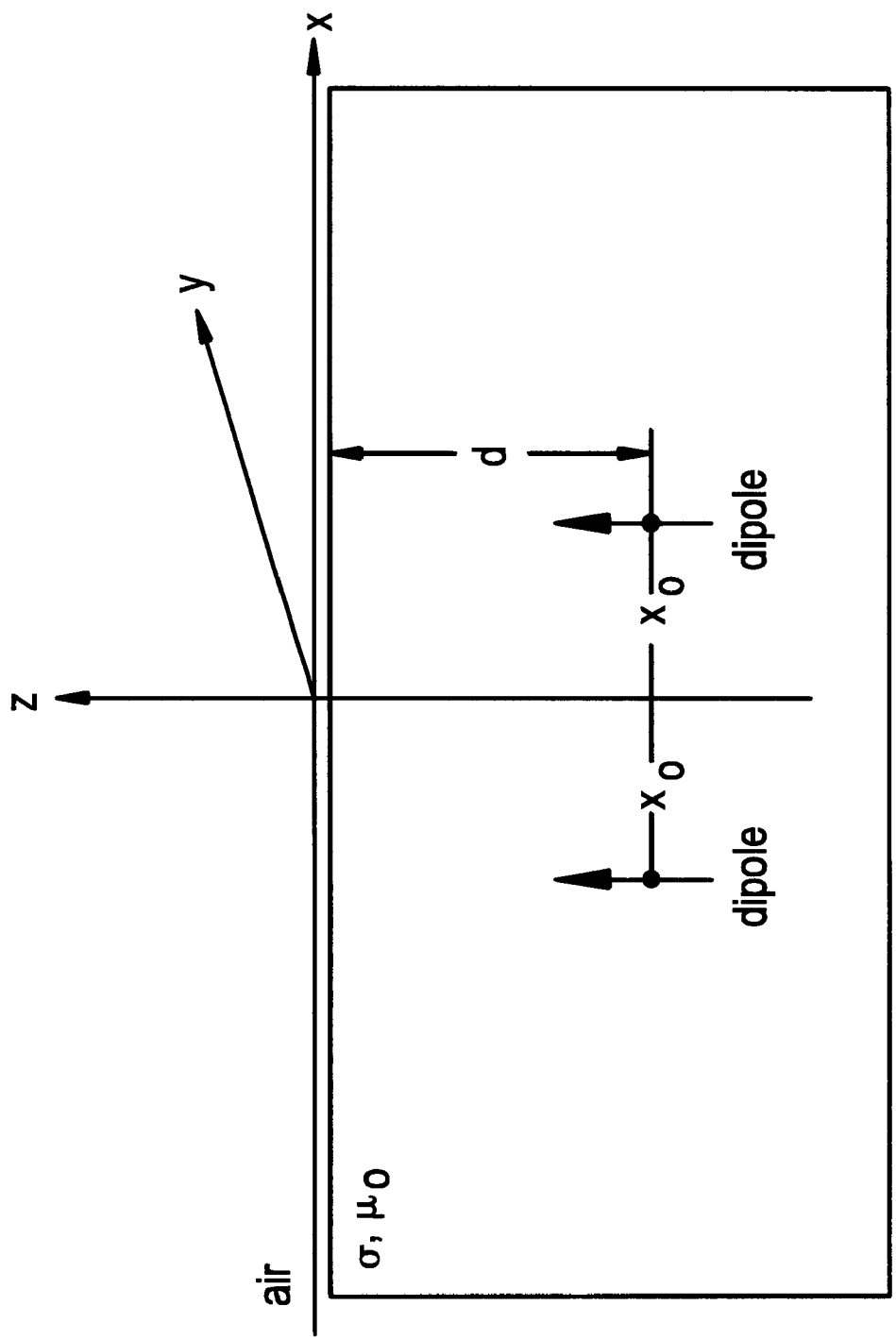
FIG. 2 illustrates the arrangement of two ideal dipole sources located in a conductive medium.

Numerical simulations to demonstrate and verify the localization method will now be considered. The first simulation is to locate two objects modeled by unit vertical magnetic dipoles. They are separated by a half meter and placed in a conductive half space one meter below the interface between the air and the conductive medium, as shown in FIG. 2. The conductivity of the medium surrounding the dipoles is assumed to be 0.01 S/m, and the dipoles oscillate at a frequency of 1000 Hz. The magnetic field radiated from the dipoles is to be measured at the interface with a horizontally placed coil having its axis in the vertical direction. Therefore, only the z-component of the magnetic field is detected.

First, the magnetic field of the dipole sources at the interface (measurement plane) produced by the dipole objects needs to be generated. The general formulas for the electromagnetic field generated by a magnetic dipole in a conductive half space are known. The integral form of the magnetic field in the low frequency approximation is used here. With the dipole source geometry and coordinate system defined in FIG. 2, the vertical magnetic field at the interface due to two unit vertical magnetic dipoles (both pointed in the positive z-direction) buried in a half-conductive medium and located at $(-x_o,0,-d)$ and $(x_o,0,-d)$ are obtained as $$H = \frac{1}{2\pi} \int_0^\infty \frac{u^3}{u+\gamma} e^{-\gamma d} \left[ J_0\left(u\sqrt{(x+x_0)^2 + y^2}\right) + J_0\left(u\sqrt{(x-x_0)^2 + y^2}\right) \right] du \quad (11)$$

where $\gamma = \sqrt{u^2 - i2\pi f\mu_0\sigma}$ $\mu_0 = 4\pi \times 10^{-7}$ H/m $\sigma = 0.01$ S/m f=1000 Hz d=1 m $x_0 = 0.25$ m  (12)

and $J_0$ is the Bessel function of the first kind of order zero.

Figure 3:
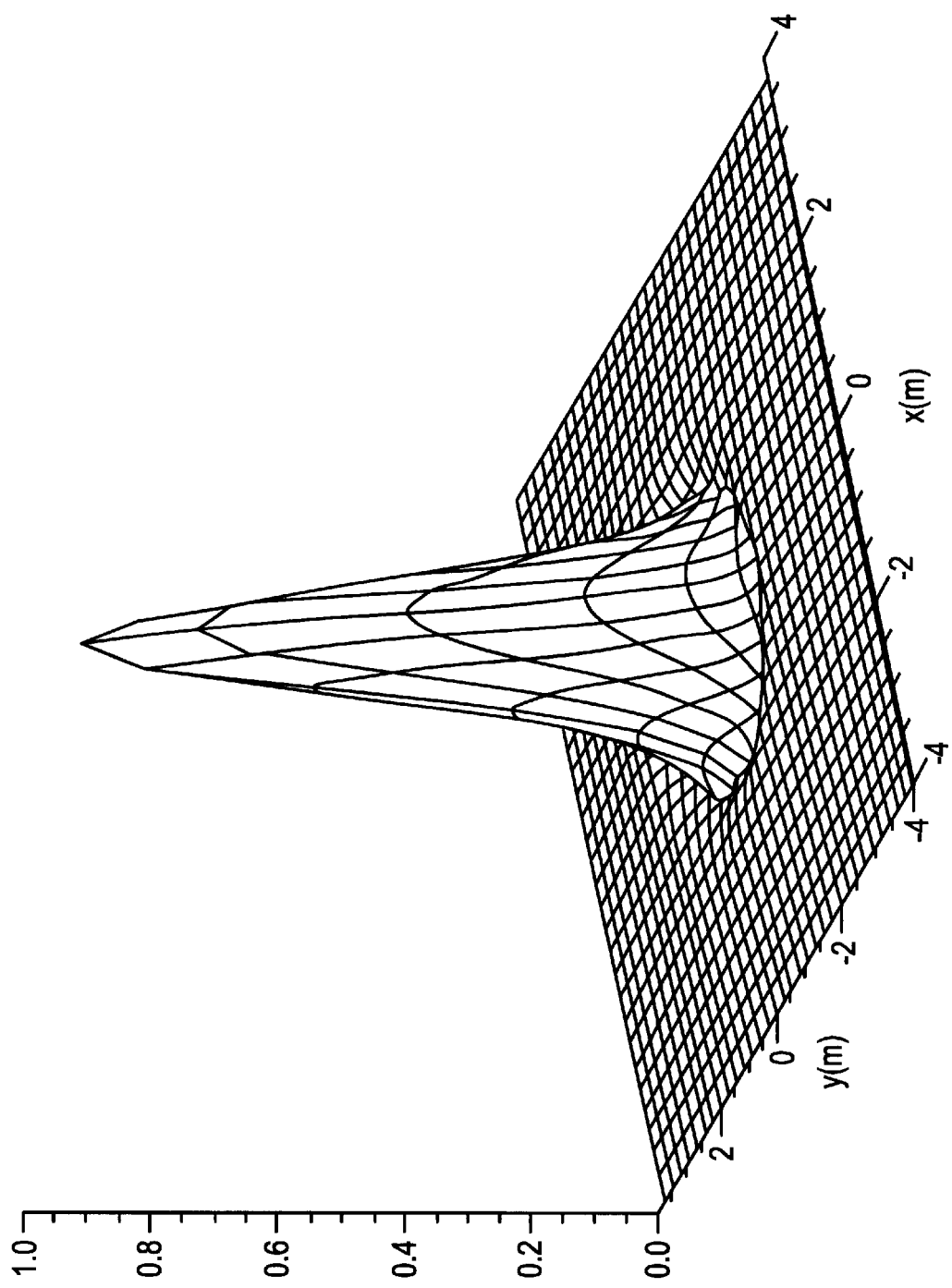
FIG. 3 is a plot of the resultant magnetic field of the two ideal dipole sources at the interface.
Figure 4G:
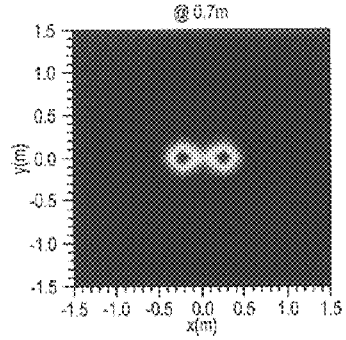
FIG. 4, consisting of FIGS. 4A–4L, displays a field image of the two ideal dipole sources measured at the interface and the reconstructed field images at various depths down to 1.1 meters.
Figure 4H:
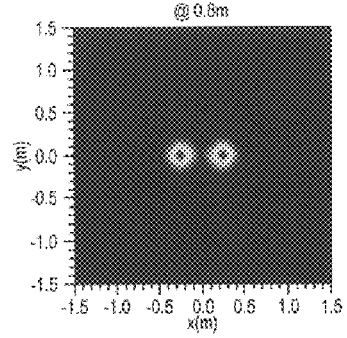
Figure 4I:
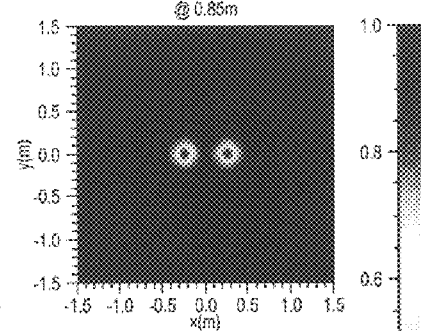
Figure 4J:
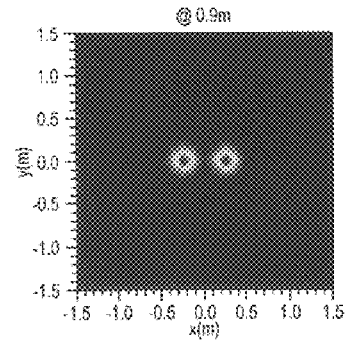
Figure 4K:
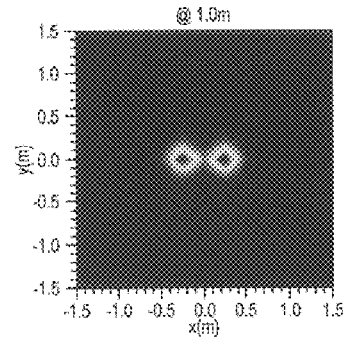
Figure 4L:
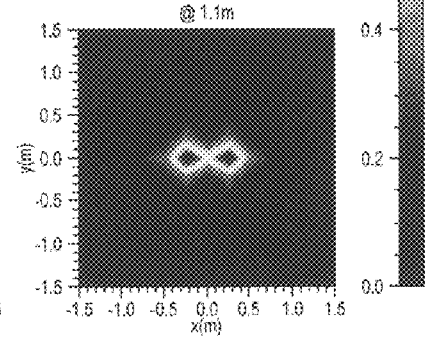

As shown in FIG. 2, the interface coincides with the plane z=0. The field is assumed to be measured on a grid of points with spacing of 0.25 m in both the x and y directions. The magnetic field detected at the surface is calculated using Eqs. (11–12), and its magnitude, normalized with its maximum value unity, is plotted in FIG. 3. The measurement window here covers from −4 meters to 3.75 meters in both the x and y dimensions. As shown in FIG. 3, the magnetic field at the interface generated by the dipole sources has a maximum at the center point (0,0). The single peaked distribution of the field looks as if the field was generated by a single source located directly beneath the center point and gives no indication that the field was generated by two separate sources.

Using the field reconstruction algorithm of the invention, the field at level planes of various depths based on the field distribution at the interface was reconstructed. The field amplitude in all of the reconstructed field images for the simulation examples and later for the tested real objects has been normalized by its peak value. FIG. 4 displays the field images at level planes arranged in the order of increasing depth from the surface down to 1 meter deep. Beyond this depth the field continues to spread.

The image at a level plane depicts the spatial distribution of the field in that plane. The sequence of images shown in FIG. 4, manifests the process of change in the field distribution along the vertical direction. By observing the image sequence we see that the field at the interface has the widest spreading and has a single peak at the center. As the depth increases, the field pattern gradually shrinks and deforms, and at the depth of 0.5 meters, the field begins to split from one peak into two peaks. Thereafter, the field pattern continues to reduce in size and the two peaks separate further and further apart. This focusing process appears to end at a depth of about 0.85 meters and then the change reverses. The field pattern starts to expand and the two peaks again merge. The image sequence of the level field distribution demonstrates the process of the field converging to the source, which is the inverse process of the field spreading from the source.

By reconstructing the field and observing the change of the field image with depth, it can be clearly seen that there are actually two separate sources located in the conductive medium, which could not be recognized from observing the field at the interface. The location of the sources can now be determined by finding the most confined field distribution pattern, or the focused field image. In this example, the most confined field image appears at the level plane which is 0.85 meters from the interface. The position of the two bright spots in the field image shows the location of the two dipoles in the x-y plane, which are (−0.25,0) and (0.25,0), respectively. The vertical location of the dipoles is given by the depth of the focused level plane, which is at z=−0.85 m.

Comparing the estimated source location with the true source location we see that the horizontal position of the two sources matches exactly the true position but that the vertical position is 0.15 meters shallower than the true position. The errors in depth estimation may come from several sources. The finite hologram aperture can cause wraparound errors in the reconstructed field. The infinite spectral band of the idealized dipole source results in an aliasing effect in sampling the field from the continuous to the discrete. A more detailed discussion on the aliasing effect is given below, followed by another simulation with a bandlimited function of two discrete point sources for which the aliasing effect is effectively reduced. The resultant depth estimation through field reconstruction becomes much closer to the true depth.

The dipoles' field at the surface is generated by the analytic formula given by Eqs. (11–12) and is a continuous function of horizontal coordinates. The field reconstruction is accomplished by a discrete numerical processing of the continuous field function. According to sampling theory, if the Fourier transform h(t) is zero for all frequencies greater than the Nyquist critical frequency $f_c$, then the continuous function h(t) can be uniquely determined from a knowledge of its samples taken at or exceeding $2f_c$. If a continuous function is not bandlimited to less than the Nyquist critical frequency, the spectrum that lies outside of the frequency range $(-f_c, f_c)$ will be folded over or aliased into the range. The dipole source used in the simulation, mathematically, is an impulse function and has an infinite bandwidth. Therefore, when sampling this infinite bandwidth field at discrete values, it will always contain aliasing errors in the spectrum. In the field reconstruction process, the spectral components are propagated backward from the interface to the level plane according to Eq. (8). As indicated in that expression, even for a very small error, it will be exponentially amplified with the propagation distance.

The source localization simulation will now be repeated with a bandlimited source function, but instead of computing the field at the interface from Eqs. (11–12), the interface field is constructed in an alternative way. The two point sources located at plane z=−1 m are represented by a two-dimensional discrete function $$s(p,q)=\delta(p\Delta+0.25)\delta(q\Delta)+\delta(p\Delta-0.25)\delta(q\Delta), -128 \leq p,q \leq 127 \quad (13)$$

where $\delta(\ )$ is the Kronecker delta function defined as $$\delta(n) = \begin{cases} 0, & n \neq 0 \\ 1, & n = 0 \end{cases}, \quad (14)$$

p and q are integer variables, and Δ is a spacing constant with the value of 0.0625 m.

Figure 5:
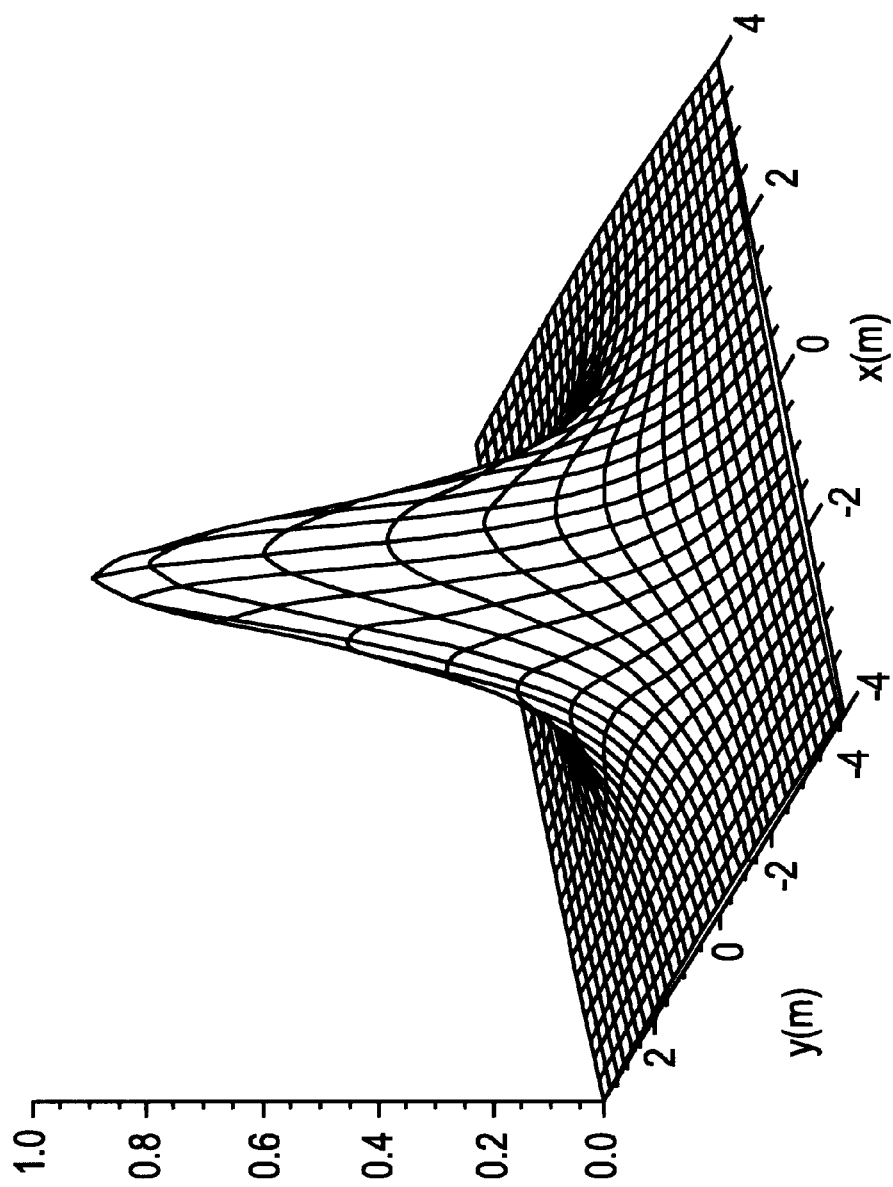
FIG. 5 is a plot of a resultant magnetic field at the interface resulted from the two band limited point sources located in a conductive medium.
Figure 6A:
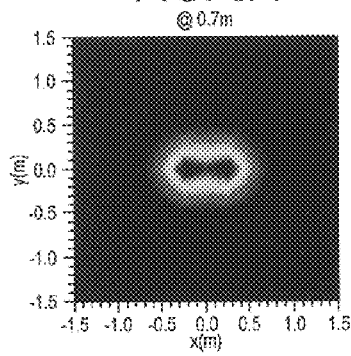
FIG. 6, consisting of FIGS. 6A–6F, displays reconstructed field images of the two bandlimited point sources at depths from 0.7 m to 1.1 m.
Figure 6B:
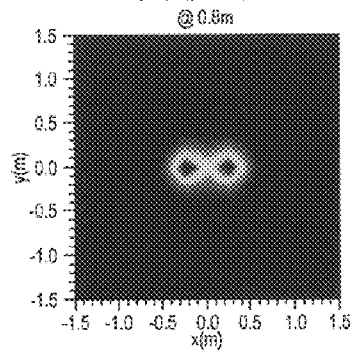
Figure 6C:
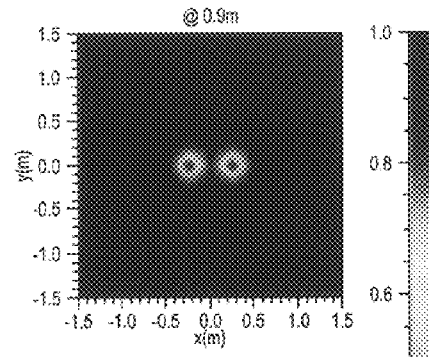
Figure 6D:
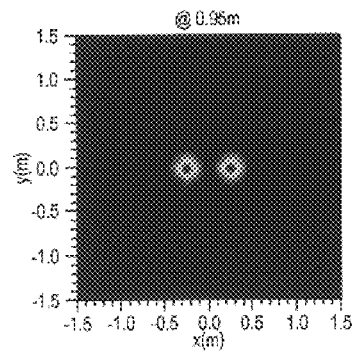
Figure 6E:
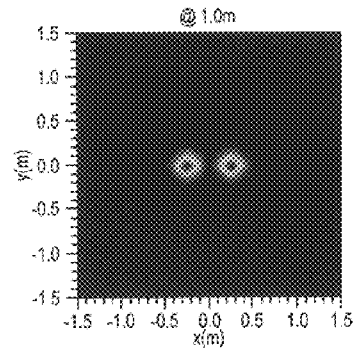
Figure 6F:
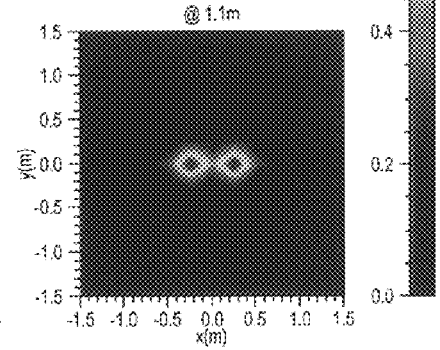

This function is Fourier transformed and propagated one meter forward to get it to the interface. Then it is inverse Fourier transformed to obtain the field distribution at the interface. This resulting interface field has its values at discrete points spaced by 0.0625 m and in a finite area of about 16 m×16 m. A hologram of the field with a sampling interval of 0.25 m is formed from this interface field in an aperture from −4 m to 3.75 m in both dimensions, as shown in FIG. 5. In comparison with the field of ideal dipoles in FIG. 3, this field value drops at a slower rate when away from the center point because it does not contain some high frequency components.

FIG. 6 displays the reconstructed field images at depths in a range of 0.7–1.1 m. It shows that the field image focused at the depth of 0.95 meter from the interface. The spectral bands are much more limited for the field induced from real objects, and depth estimation errors in some real cases are expected to be further reduced.

The numerical simulations demonstrate that, after applying nearfield electromagnetic holography to process the detected surface field data, not only can closely placed sources be resolved even if they are separated only by $5 \times 10^{-4}$ of the wavelength, but their locations in 3D-space can also be determined.

In practical application, the invention is used to localize buried objects with an active EM source. An active electromagnetic source excites the object to radiate an electromagnetic field. The object field transmitted directly from the object is what is needed to obtain the location of the object.

Generally, for a system operating in an electromagnetic induction mode, the signals detected at the receive coil are a mixture of the primary field directly from the source and the secondary field coming from the object. The primary field is usually several orders of magnitude greater than the secondary field. It is usually very hard to separate the secondary field from the primary one.

The commonly used method for frequency-domain electromagnetic induction measurements is to use bucking coils to cancel out the primary field at some point where the receiver coil is placed. For example, in the rigid boom slingram method, the data is collected in such a way that the receiver coil is at a fixed distance with respect to the transmitter coil during the entire measurement. The cancellation of the primary field in this case needs to be done only at one particular point.

However, for the invention, the field at multiple locations needs to be measured relative to the transmitter coil. If the range between the transmitter coil and the receiver coil varies, the primary field would have to be bucked out at each receiver location with different bucking coils. In order to effectively remove the primary source field from the detected field, the time-domain method is used for the measurement of the object field.

The time domain system works in an on-and-off mode. During the on period, the transmitter coil current is turned on and an impulse field is generated. After a short duration the current in the transmitter coil is turned off for an interval of time. During the off period, the detection coil measures the response from the object, effectively preventing the primary field from being measured together with the secondary field.

Generally, after the source is turned off, the response includes both the response from the earth as well as from objects of interest. The response from the earth decays faster than the response from the metallic objects. By waiting long enough one can virtually avoid the response from the earth, and only detect the decay tail of the response from the object. The time response of the secondary field is then Fourier transformed to the frequency domain, and a field hologram of the object at the detection plane is formed at a selected frequency and used for the field reconstruction.

Figure 7:
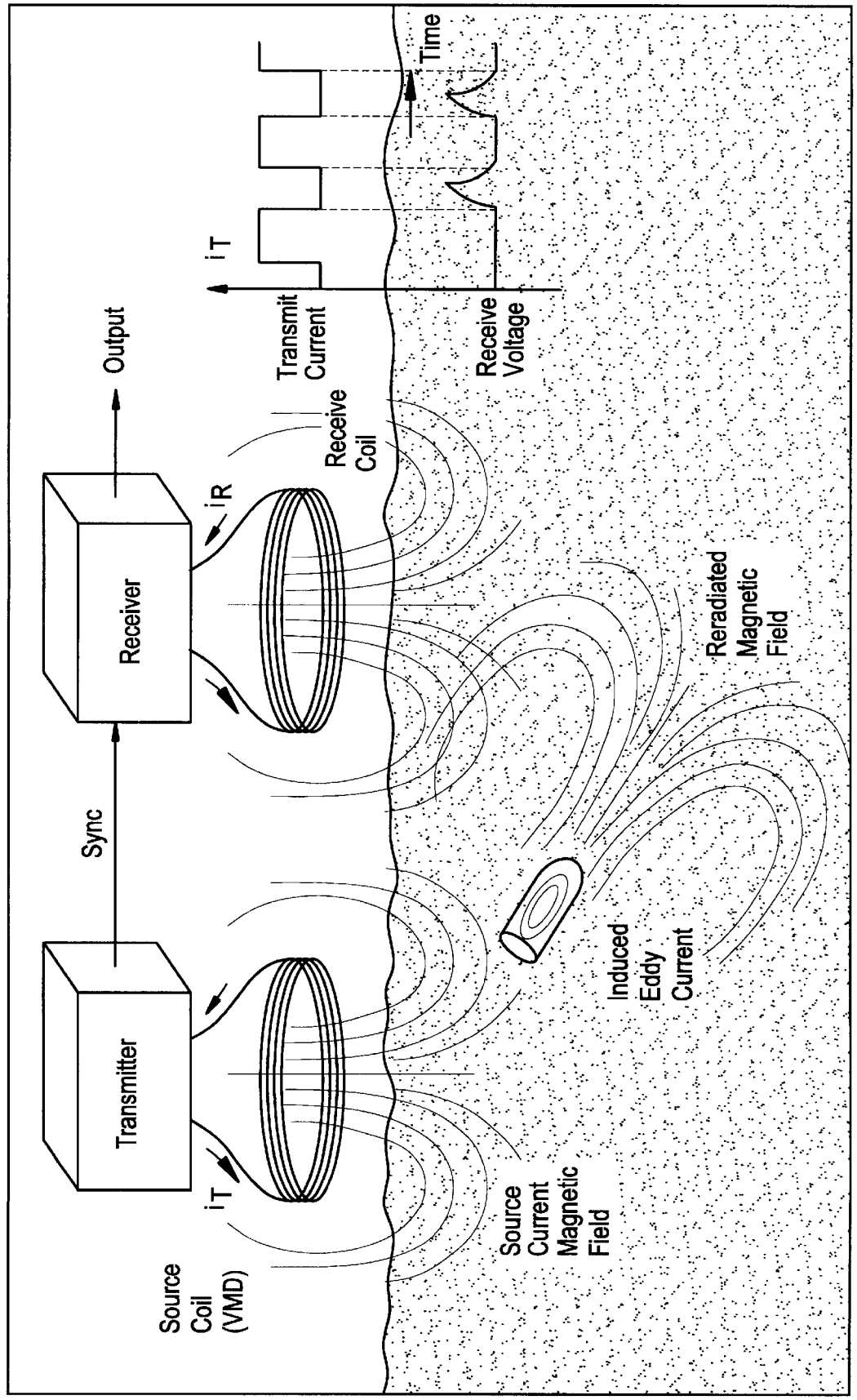
FIG. 7 is a simplified diagram of the time-domain electromagnetic measurement technique.

FIG. 7 shows a simplified diagram of the time-domain electromagnetic (TEM) technique. After a current loop transmitter is placed in the vicinity of the buried target, a steady current is caused to flow in the transmitter loop for a sufficiently long time to allow turn-on transients in the ground to dissipate. The loop current is then quickly turned off. According to Faraday's Law, the rapid reduction in the transmitter's magnetic field induces an electromotive force (emf) in nearby conductors. This emf causes eddy currents to flow in the conductor with a characteristic decay time that depends on the conductivity, size, and shape of the conductor. The decay currents generate a secondary magnetic field, the time rate-of-change of which is measured by a receiver coil located above the ground.

Figure 8:
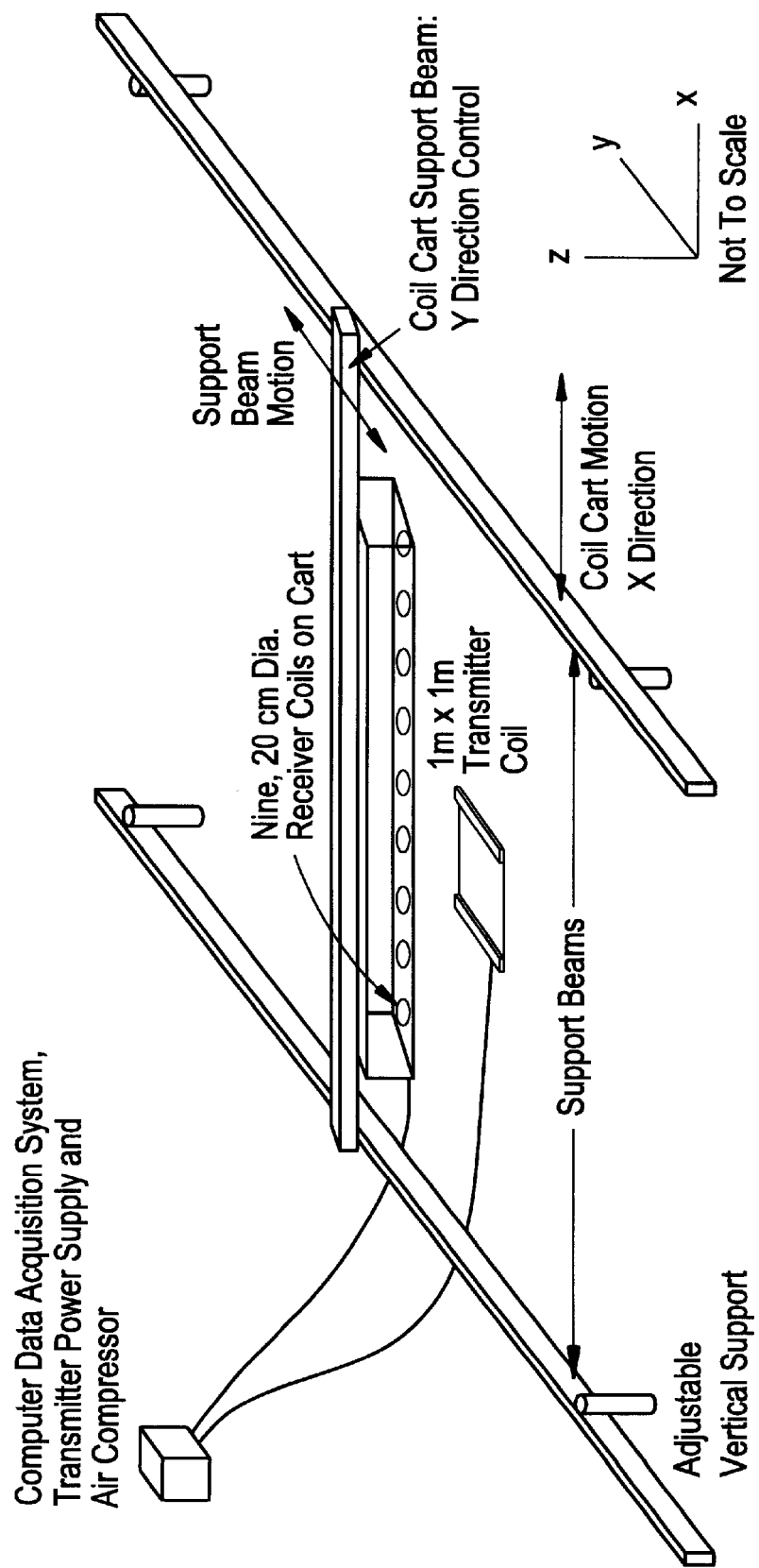
FIG. 8 illustrates a time-domain electromagnetic system and scanning frame.

As depicted in FIG. 8, an implementation of the TEM technique is composed of three major systems: a pneumatically-driven, mechanical scanning frame for the receiver coils; the transmitter and receiver electronics; and the data acquisition system.

The decaying magnetic field over the area above the target is measured by an array, linear or two-dimensional, of receiver coils located on a variable height coil cart which is moved on an X-Y frame, much like an "X-Y plotter". The X-Y plotter frame can be constructed of fiberglass and plastic. Both the coil cart and support frame can be positioned using a pneumatically driven claw/piston system as illustrated in FIGS. 9–11.

Figure 9:
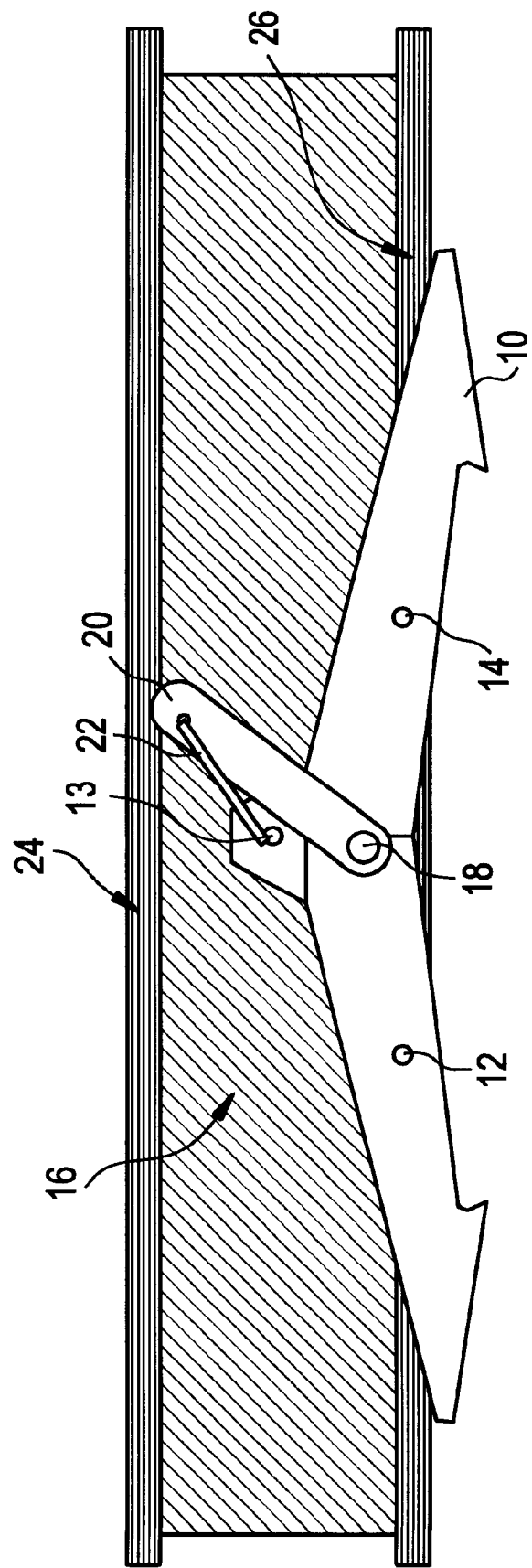
FIG. 9 illustrates the claw and control arm portion of the claw/piston system of the invention attached to a sliding support plate.

FIG. 9 shows the claw 10 portion of the claw/piston system with pegs 12, 13, 14. The claw is attached to support plate 16 and pivots about axle 18. Also attached to the axle is control arm 20; elastic means 22 is attached to the end of the control arm opposite from th6 axle and to peg 13. Slotted brackets 24, 26 are attached respectively to the carriage or cart to be moved and to the frame over which it is to be moved with the support plate sliding back and forth inside the slots in the slotted brackets.

Figure 10:
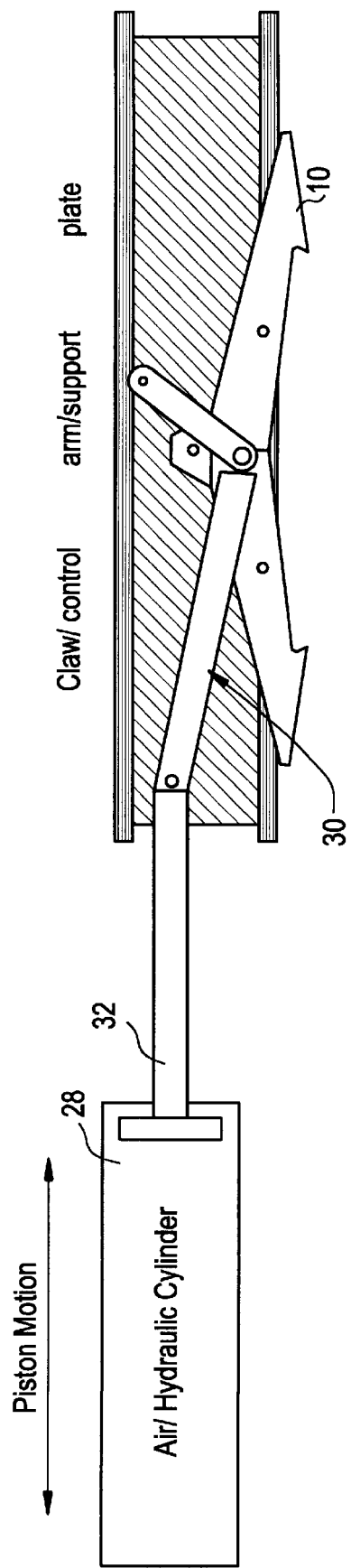
FIG. 10 illustrates the claw/piston system of the invention.

FIG. 10 shows the claw attached to an air/hydraulic cylinder 28 via a connecting rod 30 which attaches to the axle and to piston 32 located in the air/hydraulic cylinder. The air/hydraulic cylinder can operate in a push/pull fashion as the piston is cycled back and forth with the piston thereby moving the support plate and claw in the same direction.

Figure 11A:
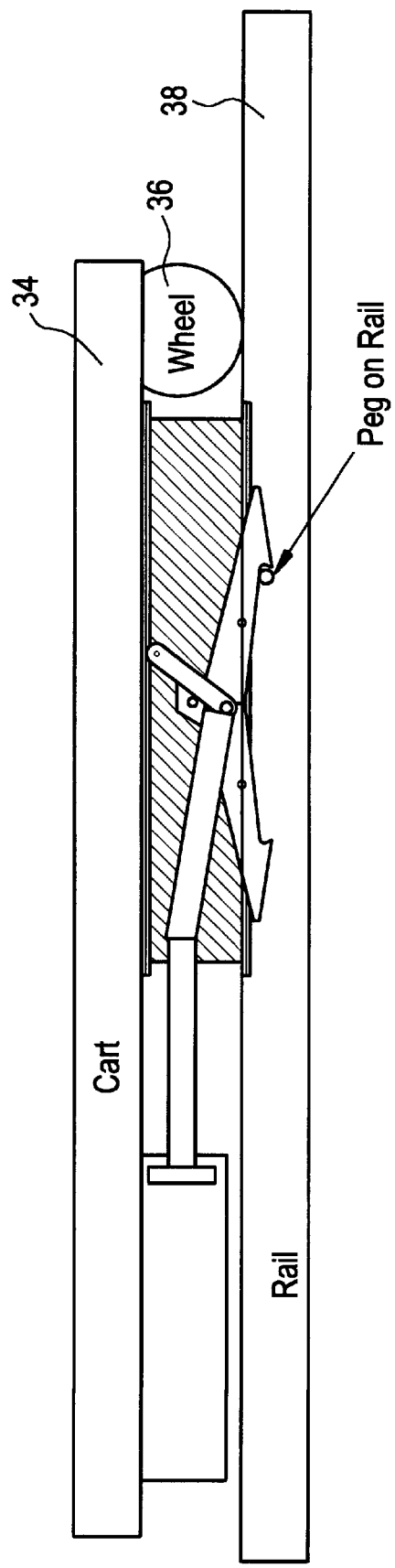
FIG. 11, consisting of FIGS. 11(*a*), 11(*b*), and 11(*c*), illustrates the operation of the claw/piston system.
Figure 11B:
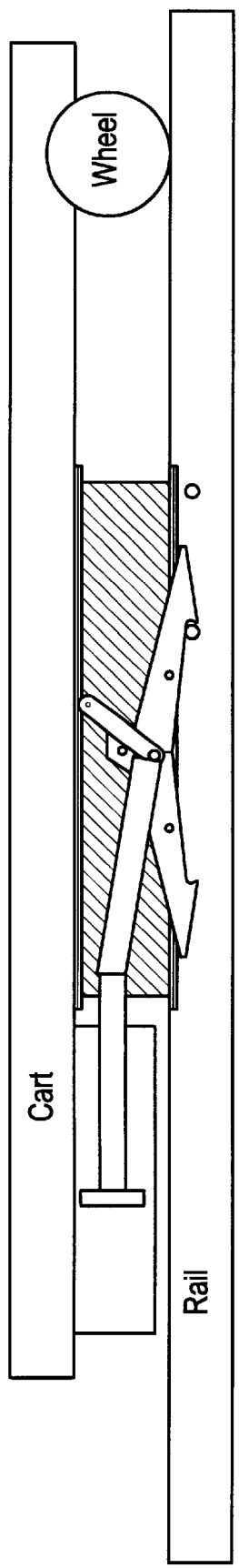
Figure 11C:
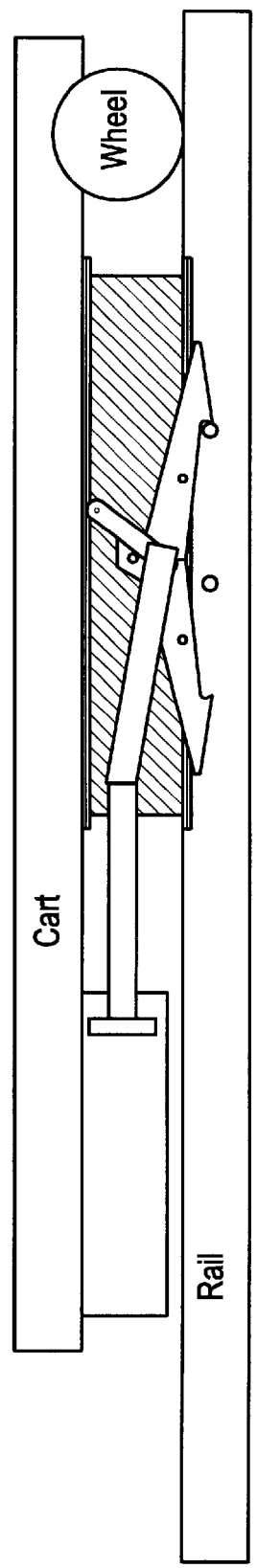

FIG. 11(a) illustrates the claw/piston system attached to a moveable cart 34 on wheels 36 resting on the rail 38 of the scanning/support frame. FIG. 11(a) also illustrates the system at the beginning of a pull stroke with the claw engaging a peg on the rail. The air/hydraulic cylinder is attached to the wheeled cart. Air/hydraulic pressure in the cylinder then pushes the piston back causing the cart to be pulled forward, as shown in FIG. 11(b). The piston is then extended to move the claw to the next peg on the rail as shown in FIG. 11(c) with the combination of the elastic means on the support arm and the sloped edge on the claw allowing the claw to ride over the next peg. Once over the rail peg, the claw slides a small distance ahead of it. The cart remains stationary during this operation. The operation then begins again with the air/hydraulic cylinder pulling the piston in and causing the claw to engage the peg and pull the cart forward. An air compressor and pneumatic directional control valves are located away from the frame, near the data acquisition system.

Figure 12:
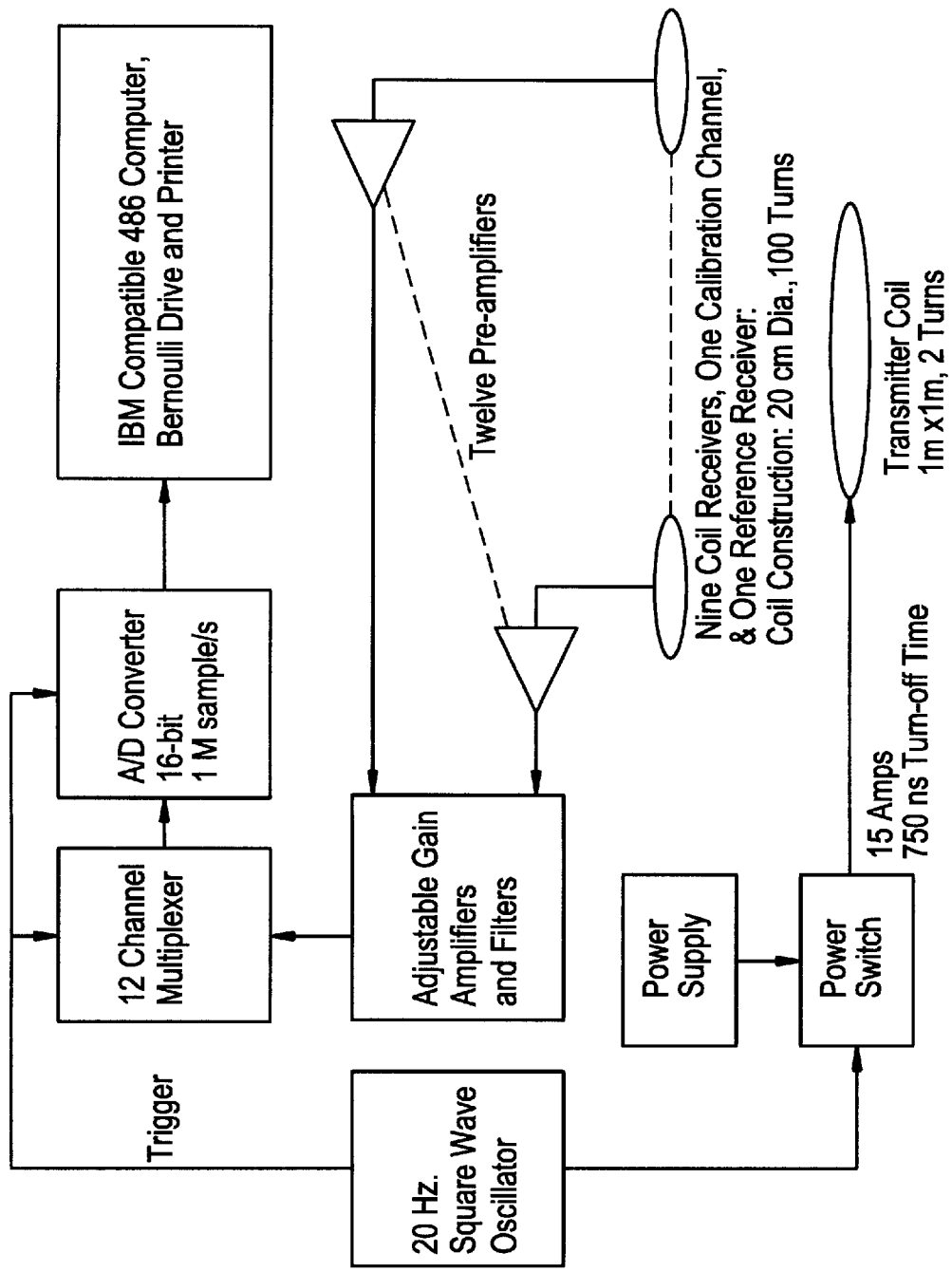
FIG. 12 is a block diagram of the time-domain electromagnetic system of the invention.
Figure 13:
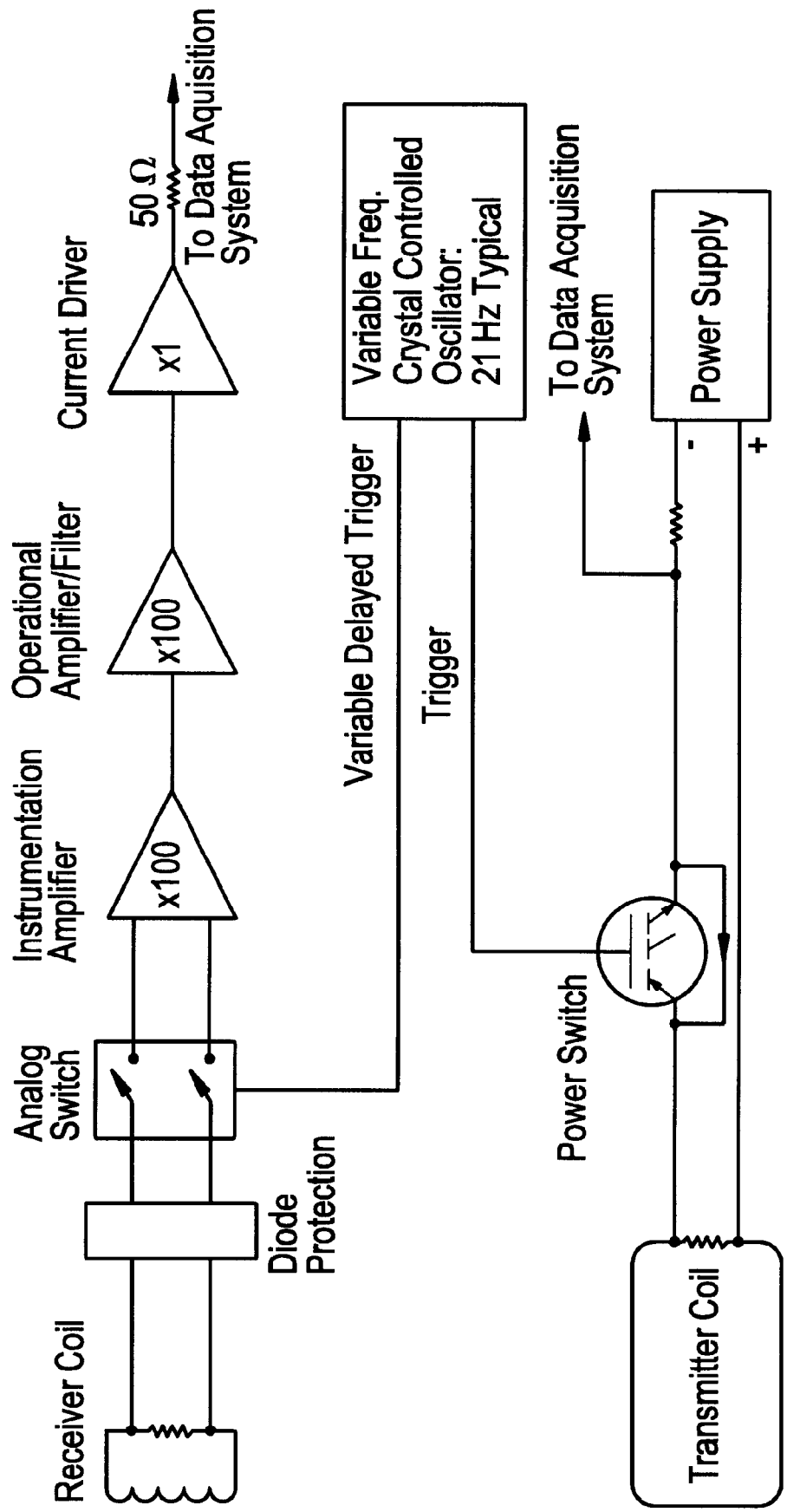
FIG. 13 is a diagram of the individual receiver amplifiers and general transmitter electronics of the invention.
Figure 15A:
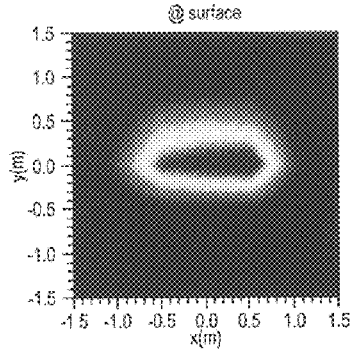
FIG. 15, consisting of FIGS. 15A–15L, displays a field image of two suspended steel pipes measured at the surface and the reconstructed field images at various heights up to 1.1 meters.
Figure 15B:
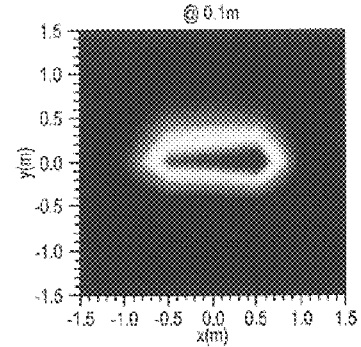
Figure 15C:
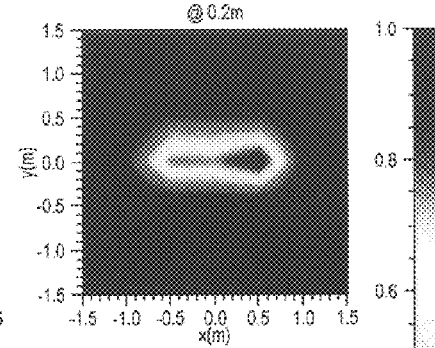
Figure 15D:
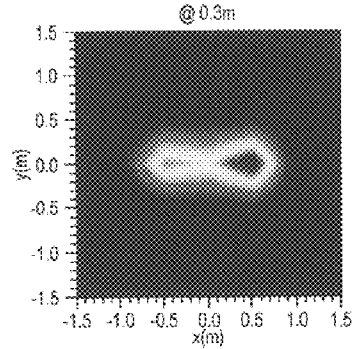
Figure 15E:
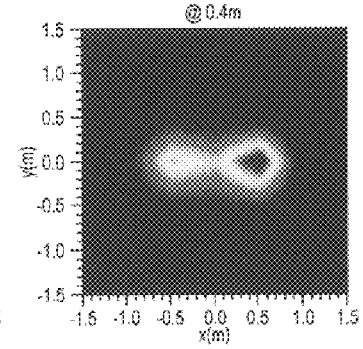
Figure 15F:
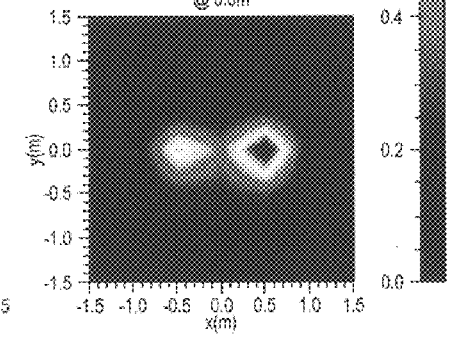
Figure 15G:
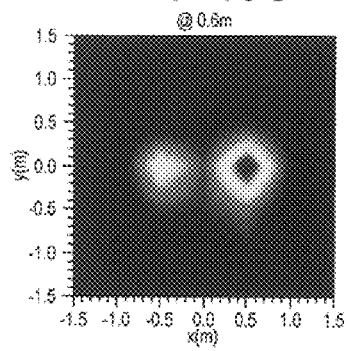
Figure 15H:
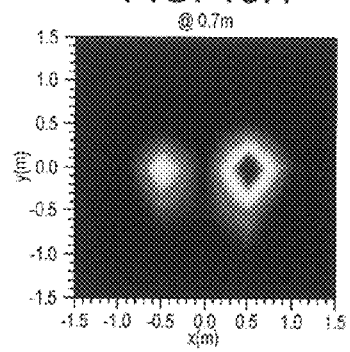
Figure 15I:
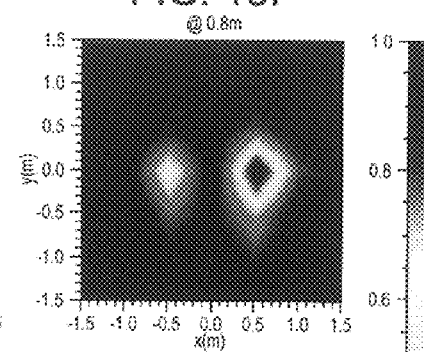
Figure 15J:
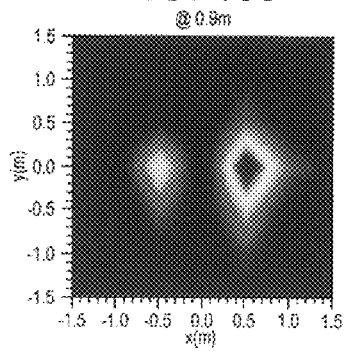
Figure 15K:
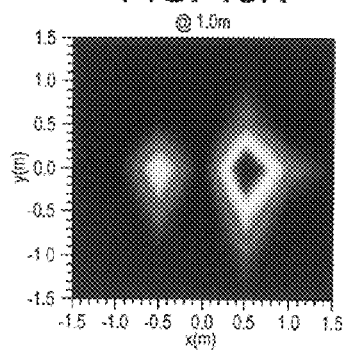
Figure 15L:
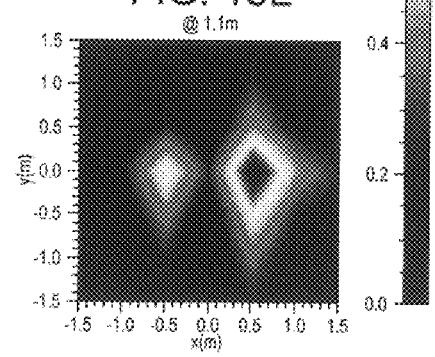
Figure 16G:
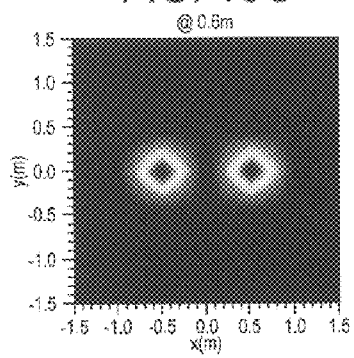
FIG. 16, consisting of FIGS. 16A–16L; displays a field image of two buried steel pipes measured at the surface and the reconstructed field images at various depths down to 1.1 meters.
Figure 16H:
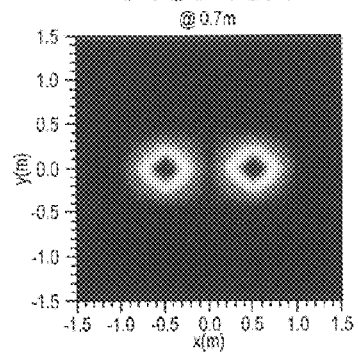
Figure 16I:
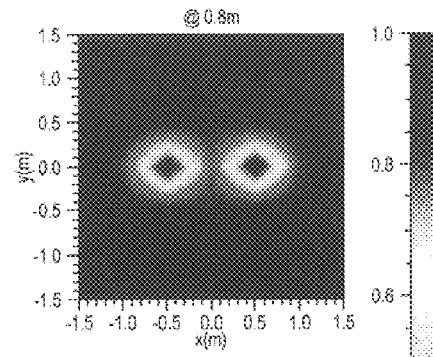
Figure 16J:
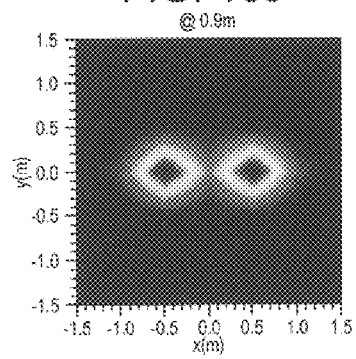
Figure 16K:
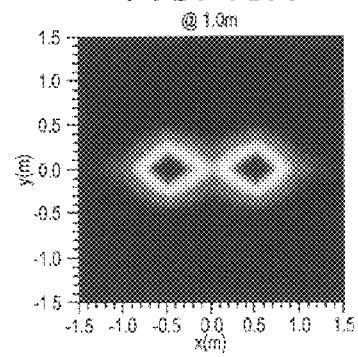
Figure 16L:
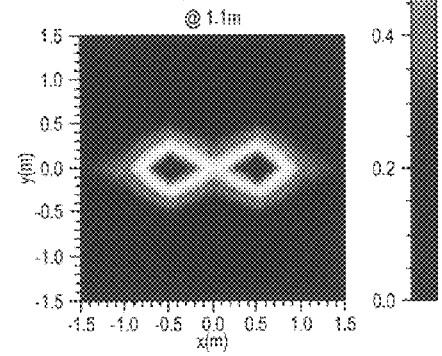
Figure 17A:
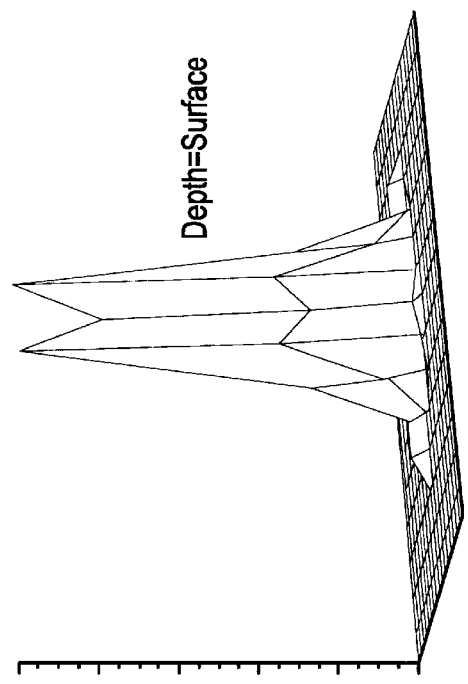
FIG. 17, consisting of FIGS. 17A–17D, are plots of the reconstructed magnetic field distributions of the two buried steel pipes at four depths.
Figure 17B:
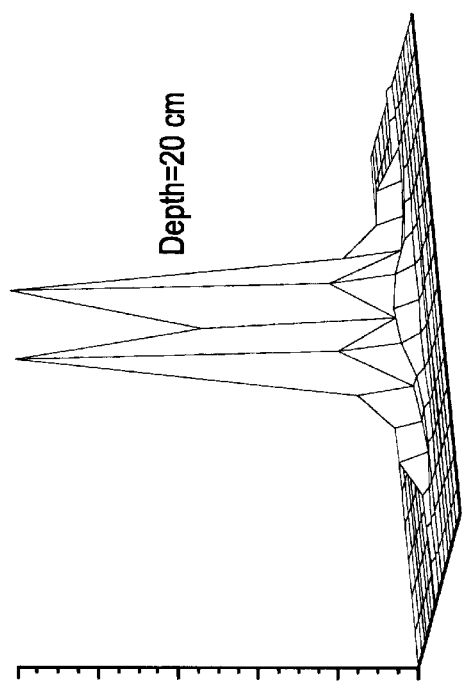
Figure 17C:
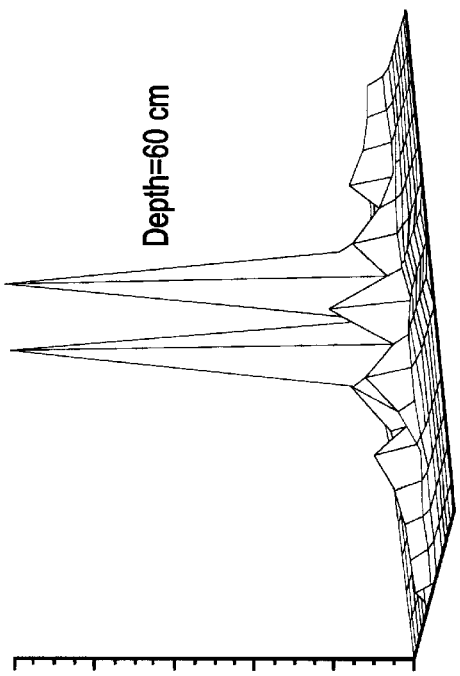
Figure 17D:
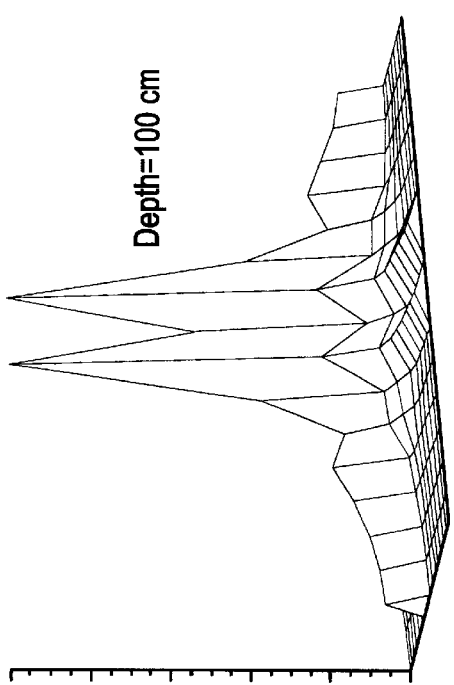
Figure 18A:
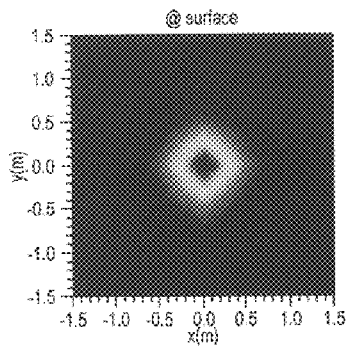
FIG. 18, consisting of FIGS. 18A–18L, displays a field image of a buried cannon ball measured at the surface and the reconstructed field images at various depths down to 1.1 meters.
Figure 18B:
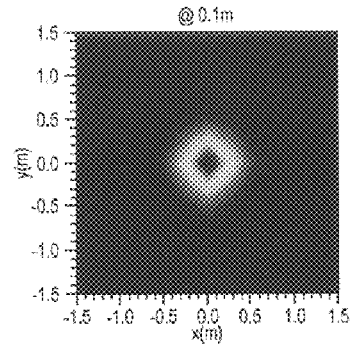
Figure 18C:
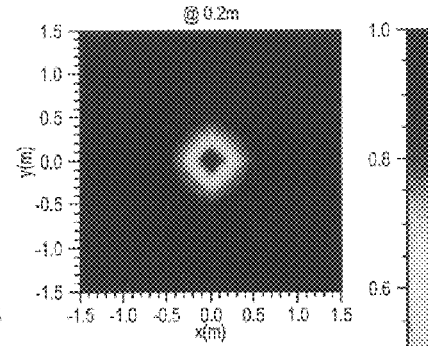
Figure 18D:
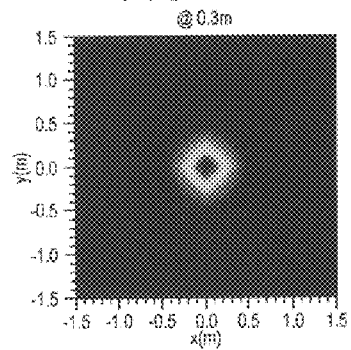
Figure 18E:
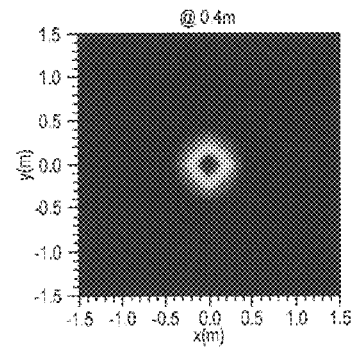
Figure 18F:
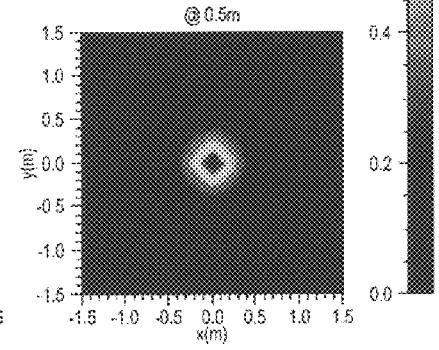
Figure 18G:
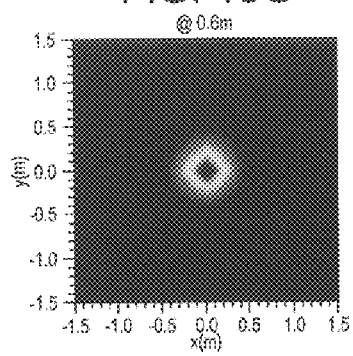
Figure 18H:
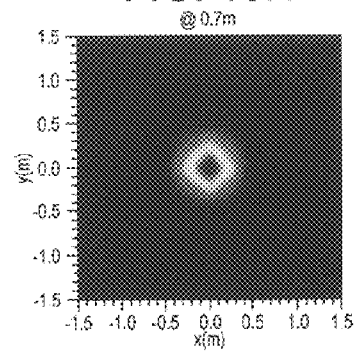
Figure 18I:
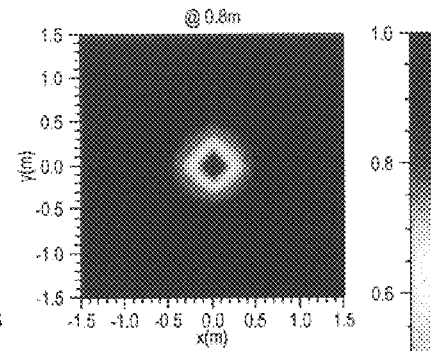
Figure 18J:
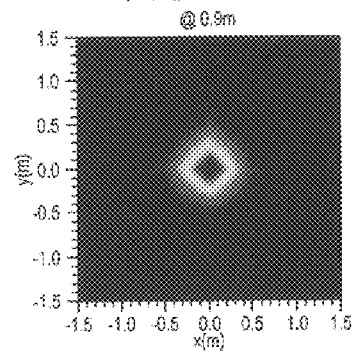
Figure 18K:
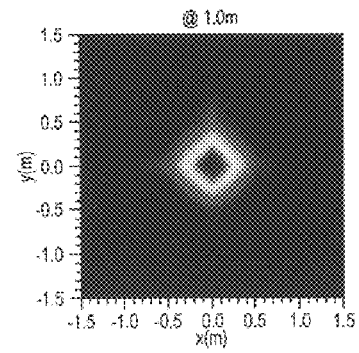
Figure 18L:
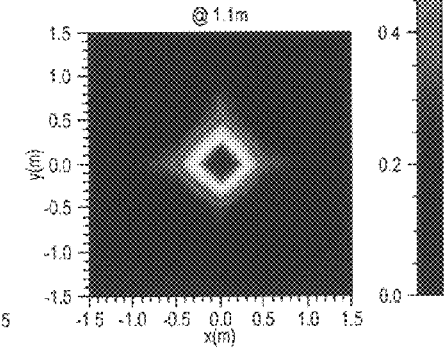
Figure 19A:
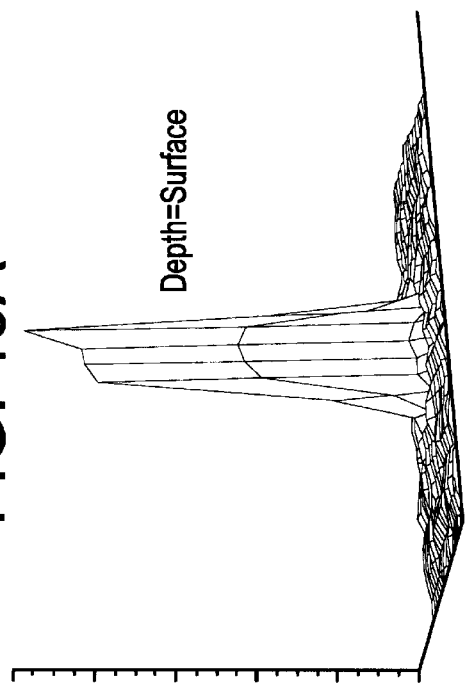
FIG. 19, consisting of FIGS. 19A–19D, are plots of the reconstructed magnetic field distributions of the two aluminum disks at four depths.
Figure 19B:
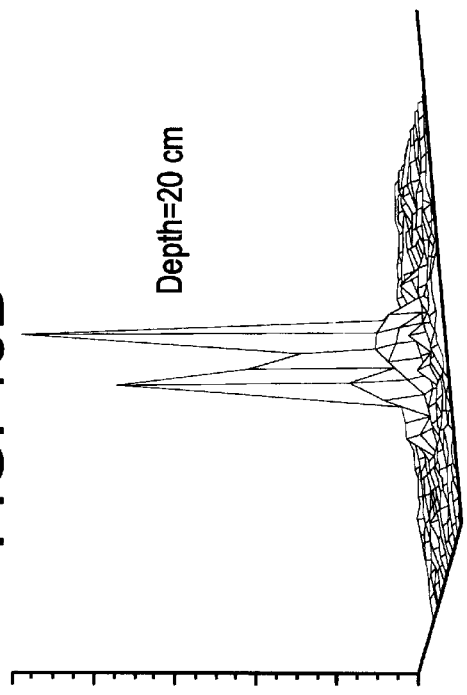
Figure 19C:
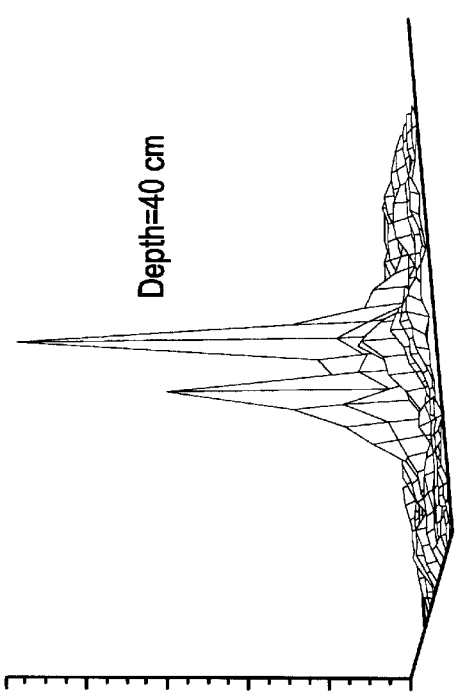
Figure 19D:
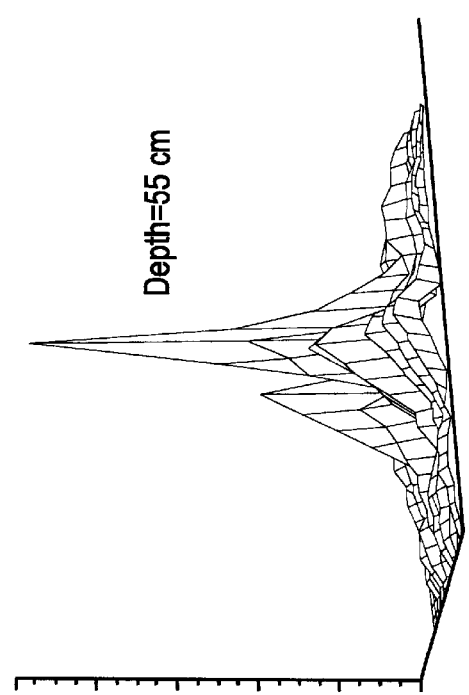

A simplified block diagram of the TEM system is shown in FIG. 12 and a diagram of the individual receiver amplifiers and general transmitter electronics is shown in FIG. 13. The receiver coil electronics are located near the receiver coils and are connected to the data acquisition system via a cable. The transmitter coil current is controlled by a 50% duty cycle, variable frequency quartz crystal oscillator operating at about 20 Hz. The oscillator's output is connected to a solid state switch near the transmitter coil. Current to the switch and transmitter coil is provided by a power supply located at the data acquisition system.

By way of example, the transmitter coil can be 1 m by 1 m square and constructed of two turns of wire wound around two-inch diameter PVC tubing. The coil is shunted with a resistor to improve its turn-off time. As constructed, the transmitter coil and switch system can turn off about 12 A in about 450 ns (90% to 10%) with little ringing. Current in the transmitter coil is monitored via a series resistor connected on the ground side of the power supply. The voltage drop across the resistor is measured by the data acquisition system.

By way of example, the toroidal receiver coils can be 20 cm in diameter and have 100 turns of wire. In this configuration, their frequency response (di/dt vs frequency) has been tested and found to be linear up to about 80 kHz. Each receiver coil is connected to its own amplifier via a short cable.

The receiver coil amplifiers, plus a battery operated power supply are housed in a water-resistant fiberglass enclosure. A receiver coil amplifier includes five components: input protection, analog switch (optional), instrumentation amplifier, operational amplifier and current driver.

The receiver coil input to the active circuitry is protected by a four diode/resistor array that clips any input signal at the positive or negative power supply voltage level. This protection is needed since the receiver coil can generate several hundred volts when it is near an active, full power transmitter coil.

An optional analog switch can be used for extra protection and is driven by a variable delay trigger that is synchronized with the transmitter signal. The purpose of the analog switch is to connect the receiver coils to the high gain amplifiers after the initial, high voltage turn-off transient from the transmitter coil has decayed in the receiver coil.

A low-noise, instrumentation amplifier provides the first stage of amplification. The gain of the instrumentation amplifier was set at 100. The instrumentation amplifier is followed by a low-noise, operational amplifier configured as a two-pole, low pass active filter with a gain of 100 and a 3 db point of about 20 kHz.

In order to drive the long data lines between the amplifier and the data acquisition system, a current driver was placed inside the feedback loop of the filter/amplifier. A 50 Ω decoupling resistor connects the amplifier to the data line.

Data acquisition is provided by an Analogic 12-channel, 16-bit analog-to-digital converter (ADC) subsystem installed in a Dynex 486, 33 MHz IBM compatible personal computer. The Analogic card has 4 Megabytes of onboard RAM that allows the ADC to collect about 6 seconds of uninterrupted data at 83 K samples/s. The data are stored on a Bernoulli disk drive for post-test data processing.

In a typical data collection scenario, the transmitter coil is placed over a suspected target. Centering of the transmitter coil over the target is not critical since the spatial magnetic field measurements will localize the target in a XYZ coordinate system referenced to the XY scanning frame. The first data collection station is at one end of the XY scanning frame. The data acquisition system collects about 6 seconds of data on the ADC RAM board. It then transfers the data to a Bernoulli disk. While data are being transferred to the disk, the scanning frame moves the receiver coils to the next data collection station. This sequence of operations is repeated until the scanning frame has swept the entire test area.

A preanalysis program separates the individual receiver channels from a pack binary format created by the data collection program. The data channels are synchronized with the transmitter pulses and averaged for about 100 transmitter pulse cycles. The resulting averaged time series is recorded as an ASCII text file. Alternatively, this averaging can be done during data collection.

The analysis program is written in the IDL programming language and performs the following steps. The spectrum of the magnetic field is obtained by applying an FFT to the individual data time series. At a chosen frequency, the nearfield electromagnetic holography method is applied to the data to reconstruct the spatial field distribution over the horizontal plane at a specified depth. For each reconstructed magnetic field distribution (RMFD) at a specified depth, the peak field is normalized to 1. By examining the RMFDs in the horizontal planes at various depths, the XYZ position of the target, relative to the scanning frame/receiver coils, can be determined. The location of the target is the point where the peak in the RMFD is in "focus" or most well defined. The results discussed below will make this idea of "focus" clearer.

Measurements have been conducted with prearranged metallic objects in preliminary tests using the PROTEM 57 sensor system from Geonics Limited. The PROTEM 57 is a transient time domain system that measures the time response of the time rate of change of the magnetic field. This system comes with a 5 m×5 m transmitter loop and a receiver coil of diameter about 60 cm. The 5 m×5 m transmitter loop was replaced with a smaller transmitter coil of 1 m×1 m in the measurements.

Test objects included steel pipes and a cannon ball. The steel pipes were tested both in air and in the ground, and the cannon ball was buried in the ground. The test configurations are shown in FIG. 14. For the above ground test, two identical steel pipes 40 cm long and 15 cm in diameter were fixed to a wooden bar and suspended about 1 meter off the ground. The two pipes were separated by 1 meter from center to center and oriented vertically, as shown in FIG. 14(a). The 1-meter transmitter coil was fixed on the ground below the pipes with its center slightly off the center line of the two pipes. The receiver coil was moved from one measurement point to another with a spacing of one half meter. The measurements were made at the surface of the ground covering a 3 m×3 m grid centered under the objects. The reconstructed magnetic field images at various heights are shown in FIG. 15.

The same pair of steel pipes were also tested when buried in the ground. The pipes were buried at 40 cm from the surface to the top with a separation of 1 meter, and the 1-meter transmitter coil was at the surface directly above the pipes, as shown in FIG. 14(b). The measurement went through a quadrant of the grid with spacing of 0.5 m. Data for the rest of the full grid were obtained by a mirror-reflecting operation over the measured one-quadrant data, as the center of the transmitter coil had been carefully adjusted to be on the symmetry line of the two pipes. The reconstructed images for the buried steel pipes are shown in FIG. 16 and plots of the reconstructed magnetic field distribution at four depths are shown in FIG. 17.

In the case of two steel pipes suspended above the ground, the at-surface field image in FIG. 15 shows a big spot which looks like there is only one object detected and with unknown height. But, as the height increases, the spot in the field image shrinks, deforms, and splits from one into two at the height of 0.3 m. It is noticed, from the field images in FIG. 15, that the separation of the two spots in the images from 0.7 m to 1.0 m is very clear, and the gaps between the two spots are prominently wider. This feature reflects the pipes' vertical location which occupied from 0.62 m to 1.02 m. Furthermore, the spots' positions in these images match the pipes' horizontal locations as well. The uneven strength of the two spots of the field image is probably due to the off-center placement of the transmitter coil.

The reconstructed field images in FIG. 15 for the buried pipes present a clear picture of the resolving and merging process of the individual field of the two pipes even though a half-overlapped field is seen at the surface. The phenomenon of prominent separation of the two spots for quite a long range is also shown in this example. It occurred in the images from 0.4 m to 0.7 m. In comparison, the depths from 0.4 m to 0.8 m are where the pipes were actually located. The image pattern change within those depths is much slower compared with the change within other depths of the same distance above or below the pipes. Apparently, the field was concentrated to the pipes in those depths where the pipes were located, and quickly spread away at other depths.

In FIG. 17, Plot A is the reconstructed magnetic field distribution (RMFD) at the plane of the receiver coil. The two steel pipes project a very strong magnetic signal at the surface which appear as a large peak with two smaller peaks on top. Plot B, RMFD depth equal to 20 cm, shows the two smaller peaks separating indicating that the large peak in Plot A was in fact caused by two separate targets. The two targets are coming into "focus" as their true depth is approached. At an RMFD depth equal to 60 cm, plot C shows the two peaks clearly separated. RMFDs at depths between 40 cm and 70 cm are almost identical, with well defined peaks. This is the region occupied by the pipes. However, as shown in plot D, at a RMFD depth equal to 100 cm, the peaks have started to recombine, and become less distinct. This depth is beyond the bottom of the pipes, the RMFD becomes "defocused."

The ability of the holographic technique of the invention to resolve horizontal position is also shown in FIG. 17. The two peaks of the RMFD at 60 cm depth are 1 m apart. This inferred separation distance matches exactly the 1 m separation of the buried pipes.

In the same preliminary test, a cannon ball of 20 cm in diameter was buried at a depth of 60 cm, as shown in FIG. 14(c). The transmitter coil was fixed at the surface directly above the ball, and the receiver coil was moved at a spacing of 0.5 m for a 4 m×4 m grid of points. FIG. 18 shows the reconstructed images of the cannon ball.

The buried cannon ball test demonstrates how a single object may be located through the field image observation. For a single object, the main goal is to determine the buried depth, because the horizontal position can be readily identified from the measured field distribution. Observing the images in FIG. 18 from converging to diverging shows that the focused image is at a depth of about 0.5 meters, while the ball was actually located with its top at 0.5 m and its center at 0.6 m.

Follow on field tests utilized the TEM system depicted in FIG. 8 and two small aluminum (Al: 6061-T6) disks, 12.7 cm in diameter and 5.7 cm thick, as test objects. To facilitate different testing configurations, the disks were not buried but were placed on the surface, in the center of the transmitter coil. The disks were separated by 51 cm and the receiver coil array was raised to 41 cm above the center of the disks. To speed up the data collection, only two thirds of the test area was scanned as the magnetic field was assumed to be symmetric about the centerline between the two disks. The missing data points in the unscanned area were filled in by the data points in the scanned area.

FIG. 19 shows plots of RMFDs at four depths. Plot A is the RMFD at the plane of the receiver coils. Because the two aluminum disks project a weak magnetic signal, one cannot be certain as to what kind of target is being scanned. At a RMFD depth equal to 20 cm, plot B shows two peaks beginning to appear. At a RMFD depth equal to 40 cm (approximate target depth), plot C clearly shows the two peaks separated. In plot D, RMFD with a depth equal to 55 cm, the peaks start to recombine, and become more diffuse, and out of focus.

The two peaks in FIG. 19 indicate that the horizontal separation of the aluminum targets is about 60 cm (three grid points). The real separation distance was 51 cm.

The receiver coil signal is approximately proportional to the third power of the range to the target. Small range changes cause large changes in received signal strength. FIG. 19 shows that the RMFD peaks are not symmetric in amplitude. This is because the receiver coil array was not precisely aligned with the targets as the scanning frame moved across the test area. In this case, as the receiver coil array was scanned over the two targets, the receiver coils were closer to the 'right' target (as shown in FIG. 19) than to the 'left' target. Hence, the signal was stronger when the receiver coils were over the 'right' target. However, signal amplitude is not the important parameter in the TEM holographic technique. It is the spatial properties that are important.

Through the above field tests, it has been demonstrated that multiple objects located as close to each other as 1 meter, which is $10^{-3}$ of the wavelength of the EM wave, can be resolved and individually localized with fairly good accuracy by reconstructing the field images at level planes using the nearfield holographic method. The positional resolution for buried metal objects in the XY plane is on the order of the receiver coil measurement spacing while the resolution in the Z direction depends on the data scanning window, receiver coil spacing as well as the dynamic range of the sensor system. The tests also show that the time-domain electromagnetic system for data acquisition is suitable for measuring the object field for the field image reconstruction in the nearfield holography method.

The numerical computations involved in the field reconstruction process is mainly that of obtaining the Fourier transforms. With the available Fast Fourier Transform (FFT) algorithm, computation is relatively fast and a real-time localization system is achievable.

A new underground object localization method—nearfield electromagnetic holographic imaging method has been developed. It localizes underground objects through field image reconstruction by utilizing spatial information of the field measured at the surface of the ground with a low frequency electromagnetic field. Both numerical simulation and field tests have shown that with this method buried metallic objects can be localized with fairly good accuracy. It has been shown that closely spaced multiple objects can be individually localized with this method even in the case that their resultant fields at the detection plane show only a single peak.

Unlike the conventional holographic method in which the resolution is limited to the order of a wavelength, the nearfield holographic method utilizes the evanescent waves in field reconstruction leading to a resolution almost independent of the wavelength. A localization resolution of about $5 \times 10^{-4}$ of a wavelength has been obtained in a simulation, and a resolution of $10^{-3}$ of a wavelength has been found in a field test.

A preliminary field test demonstrates that with the transient time domain data acquisition method for measuring the object field, the difficulty of separating the induced object field from the primary source field encountered in electromagnetic induction measurements can be overcome. With the combination of the nearfield holography method and the available FFT algorithm a real time system for underground object localization is achievable.

We claim:

1. An apparatus for locating a buried, metallic object comprising:
   a transmitter coil located in the vicinity of the object for inducing an electromotive force in the object thereby causing eddy currents to flow in the object;
   a plurality of receiver coils located over the area above the object for measuring a decaying secondary magnetic field generated by the eddy currents;
   means for moving the receiver coils over the area above the object, the moving means comprising:
      means for supporting the receiver coils in an array, and allowing vertical and horizontal movement of the array; and
      means for positioning the array over the area above the object, the positioning means comprising:
         a claw for engaging a first peg on the receiver coil array supporting means; and
         a piston for pulling the claw when engaging the first peg to move the supporting means and for pushing the claw to disengage the claw from the first peg and move the claw to a second peg; and
         computer means for acquiring and processing data received from the receiver coils to determine the location of the object.

2. The apparatus as recited in claim 1, the positioning means further comprising:
   pneumatic directional control valves for driving the piston and claw for positioning the array over the area above the object.

3. The apparatus is recited in claim 2, the positioning means further comprising an air compressor for supplying air to drive the piston.

* * * * *